United States Patent
Thatte et al.

(10) Patent No.: US 7,380,166 B2
(45) Date of Patent: *May 27, 2008

(54) COMPENSATION FRAMEWORK FOR LONG RUNNING TRANSACTIONS

(75) Inventors: Satish Ramchandra Thatte, Redmond, WA (US); Lucius Gregory Meredith, Seattle, WA (US); Marc Levy, Woodinville, WA (US); Bimal Kumar Mehta, Sammamish, WA (US); Johannes Klein, Sammamish, WA (US); Anthony Dean Andrews, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/093,793

(22) Filed: Mar. 30, 2005

(65) Prior Publication Data

US 2005/0193286 A1 Sep. 1, 2005

Related U.S. Application Data

(63) Continuation of application No. 10/086,032, filed on Feb. 28, 2002, now Pat. No. 6,918,053, which is a continuation-in-part of application No. 09/560,225, filed on Apr. 28, 2000, now Pat. No. 6,625,602, which is a continuation-in-part of application No. 09/560,373, filed on Apr. 28, 2000.

(51) Int. Cl.
*G06F 11/00* (2006.01)

(52) U.S. Cl. .......................... 714/20; 714/16

(58) Field of Classification Search .................. 714/16, 714/17, 19, 20; 707/202
See application file for complete search history.

(56) References Cited

U.S. PATENT DOCUMENTS

| | | |
|---|---|---|
| 5,261,069 A | 11/1993 | Wilkinson et al. |
| 5,524,241 A | 6/1996 | Ghoneimy et al. |
| 5,581,691 A | 12/1996 | Hsu et al. |
| 5,630,069 A | 5/1997 | Flores et al. |
| 5,706,429 A | 1/1998 | Lai et al. |
| 5,870,545 A | 2/1999 | Davis et al. |
| 5,878,206 A | 3/1999 | Chen et al. |
| 5,918,218 A | 6/1999 | Harris et al. |
| 5,940,839 A | 8/1999 | Chen et al. |
| 5,960,420 A | 9/1999 | Leymann et al. |
| 6,009,405 A | 12/1999 | Leymann et al. |
| 6,012,094 A | 1/2000 | Leymann et al. |
| 6,058,373 A | 5/2000 | Blinn et al. |

(Continued)

OTHER PUBLICATIONS

Satish Thatte, Message Exchange Protocols for Web Services, W3C Workshop on Web Services, Apr. 11-12, 2001, 5 pages, San Jose, California, USA.

(Continued)

*Primary Examiner*—Scott T Baderman
*Assistant Examiner*—Paul F. Contino
(74) *Attorney, Agent, or Firm*—Amin, Turocy & Calvin, LLP

(57) ABSTRACT

An error-handling framework is provided for business process transactions. The error-handling framework facilitates coordination of the invocation of exception and compensation handlers in response to errors. The error-handling framework includes support for custom ordering of compensation actions, data flow into and out of compensation actions, and management of the process state visible to compensation actions.

19 Claims, 17 Drawing Sheets

U.S. PATENT DOCUMENTS

| | | |
|---|---|---|
| 6,148,290 A | 11/2000 | Dan et al. |
| 6,298,457 B1 | 10/2001 | Rachlin et al. |
| 6,308,287 B1 | 10/2001 | Mitchell et al. |
| 6,401,111 B1 | 6/2002 | Dan et al. |
| 6,438,528 B1 | 8/2002 | Jensen et al. |
| 6,578,159 B1 | 6/2003 | Kitagawa et al. |
| 2002/0059306 A1 | 5/2002 | Leymann et al. |
| 2002/0194053 A1 | 12/2002 | Barrett et al. |

OTHER PUBLICATIONS

Satish Thatte, Xlang: Web Services for Business Process Design, Microsoft Corporation, 2001, 46 pages.

BUSINESS WORKFLOW PROCESSING LANGUAGE

| | | |
|---|---|---|
| schedule | ::= | header? process? contextRef? |
| header | ::= | portList? messageList? contextList? |
| process | ::= | zero \| sequence \| switch \| map \| copy\| partition \| connect \| cut |
| portList | ::= | port* |
| messageList | ::= | message* |
| contextList | ::= | context* |
| zero | ::= | zero |
| sequence | ::= | genericAction* process? contextRef? |
| genericAction | ::= | silence \| action \| task \| call \| return \| release |
| silence | ::= | silence |
| action | ::= | source \| sink |
| source | ::= | portRef messageRef contextRef? |
| sink | ::= | portRef messageRef contextRerf? |
| task | ::= | action* contextRef? |
| call | ::= | schedRef portRef* messageRef* contextRef? |
| switch | ::= | branch* (default process) ? contextRef? |
| branch | ::= | case process |
| case | ::= | ruleRef msgRef msgRef |
| map | ::= | process assignmentList? contextRef? |
| assignmentList | ::= | asignment* |
| assignment | ::= | messageRef portRef |
| copy | ::= | process contextRef? |
| partition | ::= | process* contextRef? |
| connect | ::= | process process connectionList contextRef? |
| connectionList | ::= | connection* |
| connection | ::= | portRef portRef |
| cut | ::= | process process process contextRef? |

| Schedule (EBNF) | | |
|---|---|---|
| schedule | ::= | *schedule* name identity header process contextRef? |
| name | ::= | *name* identifier |
| identity | ::= | *guid* GUID |
| header | ::= | portList messageList contextList? |
| portList | ::= | *portList* port* |
| messageList | ::= | *messageList* message* |
| contextList | ::= | *contextList* context* |
| scheduleRef | ::= | *scheduleRef* URI |

| Context (EBNF) |
|---|
| context ::= context localDecls? process transaction? exception? |
| transaction ::= transaction txnid compensation? |
| txnid ::= NCname |
| compensation ::= compensation process |
| exception ::= exception pick finally? |
| finally ::= finally process |

FIG. 7

COMPENSATION FRAMEWORK FOR LONG RUNNING TRANSACTIONS

CROSS-REFERENCE TO RELATED APPLICATIONS

This application is a continuation of U.S. patent application Ser. No. 10/086,032 entitled COMPENSATION FRAMEWORK FOR LONG RUNNING TRANSACTIONS, filed Feb. 28, 2002; which is a continuation-in-part of issued U.S. Pat. No. 6,625,602 entitled METHOD AND SYSTEM FOR HIERARCHICAL TRANSACTIONS AND COMPENSATION, filed Apr. 28, 2000; which is a continuation-in-part of co-pending U.S. patent application Ser. No. 09/560,373 entitled MODEL FOR BUSINESS WORKFLOW PROCESSES, filed Apr. 28, 2000. The entireties of which are incorporated herein by reference.

TECHNICAL FIELD

The present invention relates to the field of workflow transaction processing and more particularly, the invention relates to a compensation framework for long running transactions.

BACKGROUND OF THE INVENTION

Workflow applications are related to businesses, governments, and other organizations where information and work product flows between various persons or departments. Workflow generally is the flow of information and control in such organizations. In a business setting, workflow processes include sales and order processing, purchasing tasks, inventory control and management, manufacturing and production control, shipping and receiving, accounts payable, and the like. Businesses continually strive to define, document, and streamline such processes in order to effectively compete.

Computer systems and associated software now provide tools with which businesses and other organizations can improve workflow. Software tools can be used to model business workflow processes or schedules and identify inefficiencies and possible improvements. In addition, where a process involves exchanging data between people, departments, plants, or even between separate companies, computer systems and networks can be used to implement such exchanges. These systems and software tools are further able to implement large-scale computations and other data or information processing which typically are associated with business related information. Automation of such information processing has led to many efficiency improvements in the modern business world; and workflow management includes effective management of information flow and control in an organization's business processes. Automation of workflow management is now allowing businesses and other organizations to further improve performance by executing workflow transactions in computer systems, including global computer networks, such as the Internet.

Workflow applications can be of particular utility in processing business transactions between different companies. In a typical application, two companies having a buyer-seller relationship can desire to automate generation and processing of purchase orders, product shipments, billing, and collections. Automating such processes can result in significant efficiency improvements. However, this inter-company application of workflow technology requires co-operation of the companies and proper interfacing of the individual company's existing computer systems. Thus far, workflow application tools have been developed which provide some capability for automating business workflow by defining workflow applications.

Many business transactions are of a short duration. A transaction is normally viewed as an atomic consistency-preserving state update. Atomic database transactions have this characteristic along with the guarantee that in case of any failure during the transactional update the partial update will be rolled back and its effects erased. For example, a buyer can wish to transmit a purchase order number along with a list of products being purchased to a seller, and the seller can wish to respond with a confirmation of the order and an expected shipment date. This type of transaction can involve a general consumer purchasing products from a retailer, or alternatively two large corporate entities which do business regularly. The data associated with the order and the confirmation can be relatively small and the transmission time for the data can be on the order of fractions of a second.

A workflow application running in a computer system can allocate system resources to the transaction during its pendency, which is generally very short—i.e. has a small latency. In this scenario, the system would use a conventional database transaction, e.g., an ACID transaction—ACID properties include atomicity, consistency, isolation, and durability. Atomicity refers to a transaction's change to a state of an overall system happening all at once or not at all. Consistency refers to a transaction being a correct transformation of the system state, and essentially means that the transaction is a correct program. Although transactions execute concurrently, isolation facilitates that transactions appear to execute before or after another transaction, because intermediate states of transactions are not visible to other transactions until the transaction commits (e.g., the data is locked during execution). Durability refers to once a transaction completes successfully (commits), its activities or its changes to the state become permanent and survive failures.

An ACID transaction locks database information for the duration of the transaction. However, there are other types of business workflow transactions which have significantly longer durations and which can occupy system resources for an unacceptably long time. Such transactions often are called long running transactions. Long running business processes or transactions require a different and somewhat looser notion of transaction (often called a long-running transaction) in which individuals can be atomic database transactions but if the overall long-running transaction fails or is cancelled for business or technical reasons, there is no automatic rollback and the partial work completed during its progress must be compensated for as best as possible.

For instance the planning and fulfillment of a travel itinerary can be viewed as a long running transaction in which individual service reservation actions can use atomic transactions at service providers. In case the itinerary is cancelled the reservation transactions must be compensated for by cancellation transactions, and the corresponding payment transactions must be compensated accordingly as well. For atomic transactions in databases the databases and transaction coordinator(s) are aware of the uncommitted updates, the order in which they must be reversed, and are in full control of such reversal. In the case of long-running transactions, the compensation process is custom and must be programmed explicitly in conjunction with error-handling behavior.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to an error-handling framework for business process transactions. The error-handling framework facilitates coordination of invocation of exception and compensation handlers in response to errors. The error-handling framework includes support for custom ordering of compensation actions, data flow into and out of compensation actions, and management of the process state visible to compensation actions. Exception and compensation propagation of nested transactions is handled seamlessly by an execution engine or run-time system. The error-handling framework provides default exception and compensation handlers in case custom handlers are not provided.

The error-handling framework can be provided as part of an overall business transaction scheduling language and runtime support thereof. A programmer can define a schedule according to the scheduling language that monitors and controls the interaction of customers and businesses in a business workflow transaction. The exception handlers and compensation handlers conform to one or more predefined rules according to a compensation and exception handling program model. During execution of the schedule, an execution engine executes the error-handling routines based on one or more predefined rules according to the error-handling framework.

According to an aspect of the present invention, transaction boundaries of a schedule are defined by a user, and a run-time system executes the schedule. As used herein, the term schedule means an application, which may comprise, for example, a workflow application. A graphical user interface or a schedule definition language may be used to define groups or sets of component actions within a schedule. Transaction boundaries are determined based on the transactional scope of the groupings. Transactions may include sub-transactions. Hierarchical relationships may be formed between transactions within a schedule. The schedule may thus comprise hierarchical transactions, which may be compensated according to various aspects of the invention. A transaction, a sub-transaction and/or an action grouped as a transaction can be provided with contexts. A custom exception handler and a custom compensation handler can be associated with the context. An execution or run-time engine handles invocation and propagation of the handlers according to a set of rules provided by an error-handling framework. The defined schedule can subsequently be bound onto specific technologies using binding tools. Instances of the schedule list are then created for execution.

A run-time engine according to the invention stores a schedule state at transaction boundaries, allowing fine granularity for users to perform schedule-monitoring functions, and improve system error recovery. In addition, the invention provides a method of committing hierarchical transactions that allows a user to allow access to data based on the user-defined transaction boundaries of the schedule. The invention includes a method and a system for executing a schedule in a computer system, as well as a computer-readable medium having computer-executable instructions for performing the inventive methods.

According to one aspect of the invention, a method for executing a hierarchical transaction having a parent transaction and a sub-transaction is provided. The method comprises executing an action associated with the sub-transaction and committing the sub-transaction upon successful completion of the action associated therewith, thereby allowing access to data associated with the action according to a transaction boundary associated with the sub-transaction. The method provides selective restriction of access to the data associated with an action in the schedule according to at least one user-defined transaction boundary and the state of the action. The method thus allows an action's associated data to be unlocked as soon as its immediate hierarchical parent transaction commits. Access is then allowed to other objects, programs, etc. even though the parent transaction may be a component inside another hierarchical transaction.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention can become apparent from the following detailed description of the invention when considered in conjunction with the drawings.

BRIEF DESCRIPTION OF THE DRAWINGS

FIG. 5 illustrates a business workflow processing language syntax in extended Backus-Naur Form Notation (EBNF) in accordance with an aspect of the present invention.

FIG. 6 illustrates a schedule construct in EBNF notation in accordance with an aspect of the present invention.

FIG. 7 illustrates a context construct in EBNF notation in accordance with an aspect of the present invention.

DETAILED DESCRIPTION OF THE INVENTION

Figure 1:
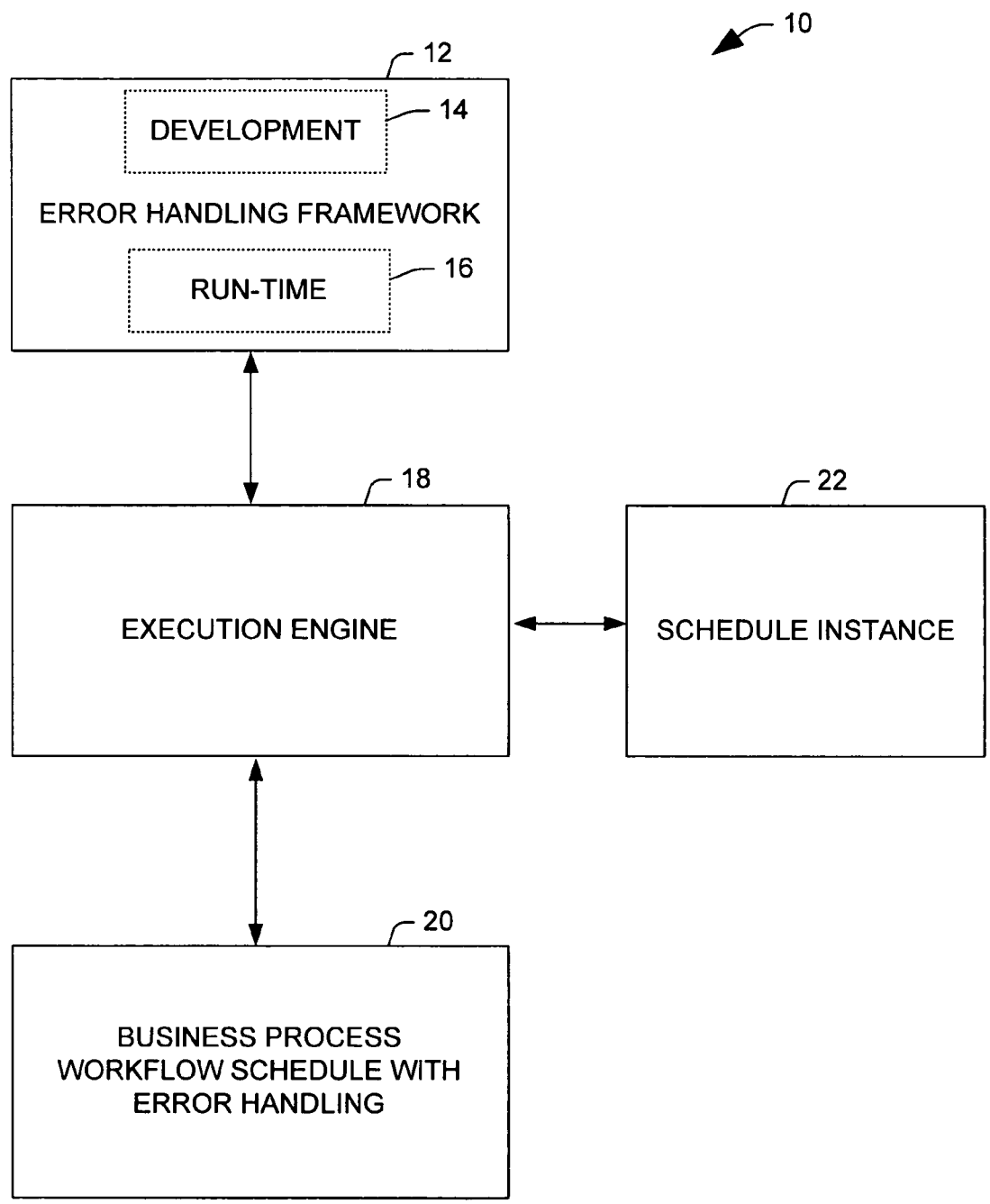
FIG. 1 illustrates a block diagram of a system for executing a business workflow schedule in accordance with an aspect of the present invention.

A transaction is normally viewed as an atomic consistency-preserving state update. Atomic database transactions have this characteristic along with the guarantee that in case of any failure during the transactional update the partial update will be rolled back and its effects erased. Long running business processes require a different and somewhat looser notion of transaction (often called a long-running transaction) in which individual transactions can be atomic database transactions but if the overall long-running transaction fails or is cancelled for business or technical reasons, there is no automatic rollback and the partial work done during its progress is compensated for as best as possible. In the case of long-running transactions, the compensation process is custom and is programmed explicitly in conjunction with error-handling behavior.

The present invention relates to an error-handling framework for business process transactions. The error-handling framework facilitates coordination of the invocation of exception and compensation handlers in response to errors. The error-handling framework described herein provides rich support for coordinating the invocation of exception and compensation handlers in response to errors, including custom ordering of compensation actions, data flow into and out of compensation actions, and management of the process state visible to compensation actions.

The error-handling framework of the present invention supports a notion of a context. The context can be associated with a unit of work, such as a transaction and/or a plurality of transactions defining a process or process form. A context provides a scope for a number of resources and behaviors including data containers, exception handlers and compensation handlers. A transactional context is permitted to provide exception and compensation handlers associated with the context. It is to be appreciated that a context can be associated with a non-transactional unit (e.g., a single actions not grouped as a transaction). However, non-transactional contexts do not support the notion of state persistence and do not have compensation handlers associated with the non-transactional context. If a compensation handler is provided, the context possesses a name that can be used to invoke the compensation handler. The error-handling framework provides default exception and compensation handlers in case custom handlers are not provided. A transactional context can be marked as an atomic transaction or a long running transaction. Compensation handlers can be parameterized and support both input and output parameters. Long running transaction and contexts can be nested to arbitrary depths.

The error-handling framework can be provided as part of an overall business transaction scheduling language. A programmer can define a schedule according to the scheduling language that monitors and controls the interaction of customers and businesses in a business workflow transaction. The schedule can includes one or more business transactions and contexts associated with the business transactions. The execution of the business transactions can be distributed across one or more computer systems and/or computer networks. Exception handlers and compensation handlers can be associated with corresponding contexts by the programmer. The exception handlers and compensation handlers can be conformed to one or more predefined rules according to a compensation and exception handling program model. Default exception handlers and compensation handlers are provided to a context that is not provided with programmer-defined handlers. During execution of the schedule, an execution engine executes the error-handling routines based on the one or more predefined rules according to the error-handling framework.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. It is to be appreciated that frameworks, engines, handlers, compensators, transactions, services, systems, schedulers, schedules can be computer components as that term is defined herein.

FIG. 1 illustrates a system 10 for executing a business workflow schedule in accordance with an aspect of the present invention. The system 10 includes an error-handling framework 12 that facilitates handling of errors as a result of a fault or cancellation in a business workflow process. The error-handling framework 12 includes one or more development components 14 and one or more run-time components 16. The one or more development components 14 and the one or more run-time components 16 define a set of predefined rules for developing and executing error-handling for business processes. The system 10 includes a business process work schedule 20 with defined error-handling routines. A user defines a business workflow schedule, for example, using a scheduling language and/or a graphical user interface. The user also develops error handlers (e.g., exception handlers, compensation handlers) using the one or more development components 14. The error handlers can be associated with portions of the business process workflow schedule 20 to compensate or correct for changed data associated with the business workflow schedule in the event of a fault or cancellation.

The system 10 also includes an execution engine 18 that executes a schedule instance 22 of the business process workflow schedule 20. It is to be appreciated that the execution engine 18 can create a plurality of schedule instances 22 based on the business workflow schedule 20. Additionally, the schedule instance 22, the execution engine 18, the error-handling framework 12 and the business process work schedule 20 can reside on a single computer or be distributed across a plurality of computers. The execution engine 18 executes the schedule instance 22, stores schedule data and executes computations associated with the schedule instance 22. In the event of a fault or cancellation, the execution engine executes one or more error handlers associated with the business process workflow schedule 20 and the schedule instance 22. During execution of the error handlers, the execution engine utilizes the one or more run-time components 16 to define default characteristics associated with executing error-handling of the system 10.

Figure 2:
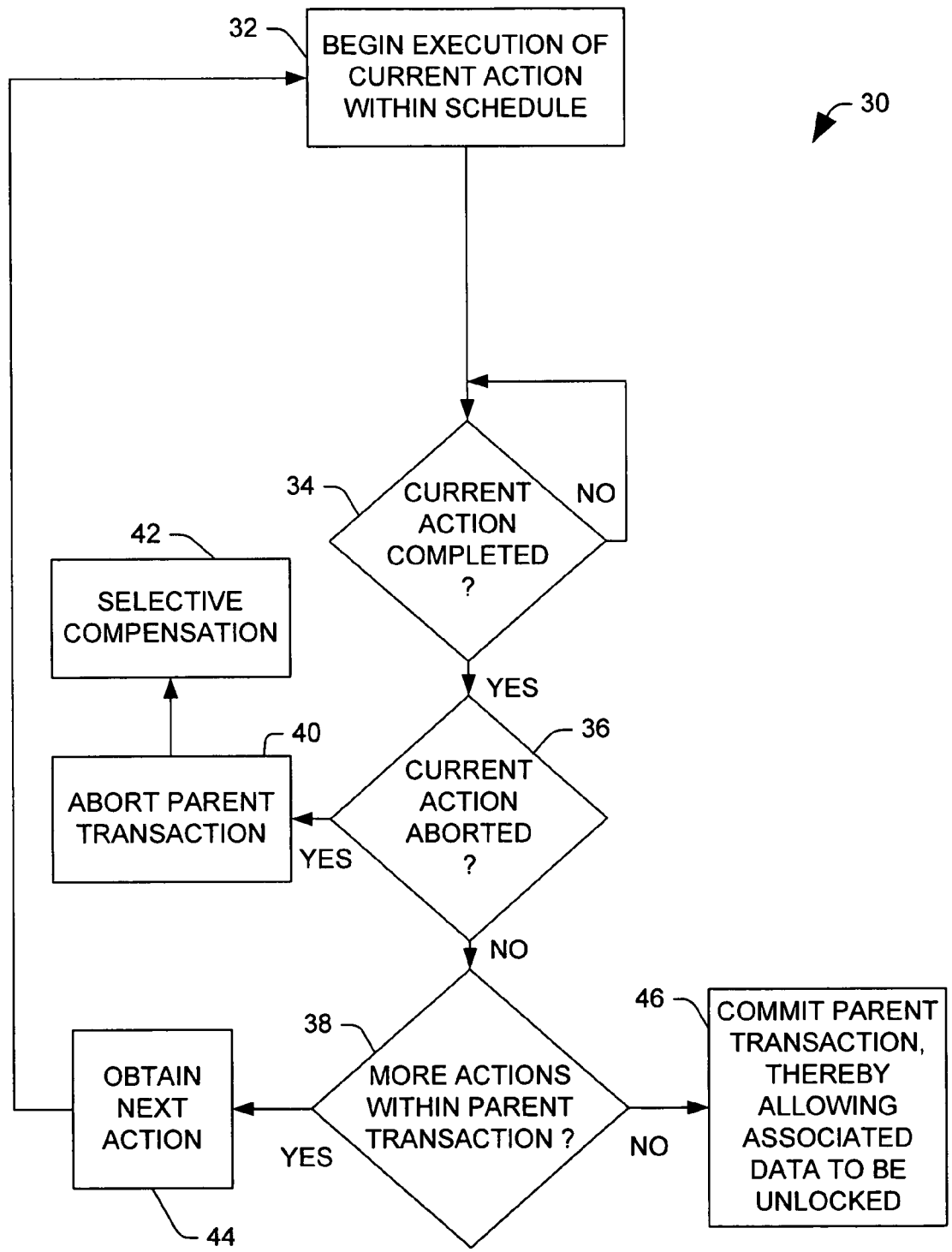
FIG. 2 illustrates a flow diagram of a methodology for executing a schedule including selectively restricting access to data associated with an action based on a transaction boundary in accordance with an aspect of the present invention.
Figure 3:
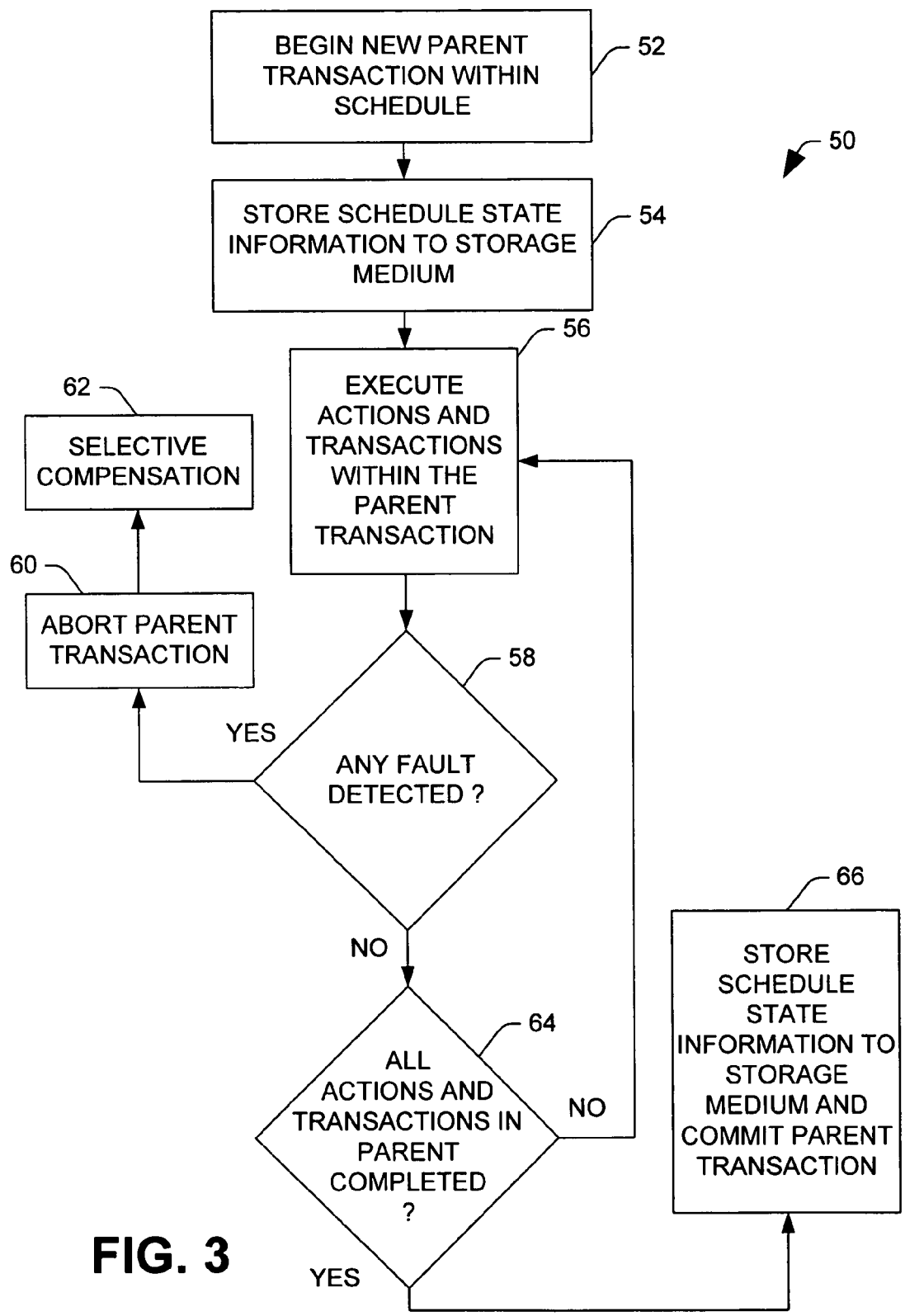
FIG. 3 illustrates a flow diagram of a methodology for executing a schedule including storing schedule state information in a storage medium based on a transaction boundary in accordance with an aspect of the present invention.
Figure 4:
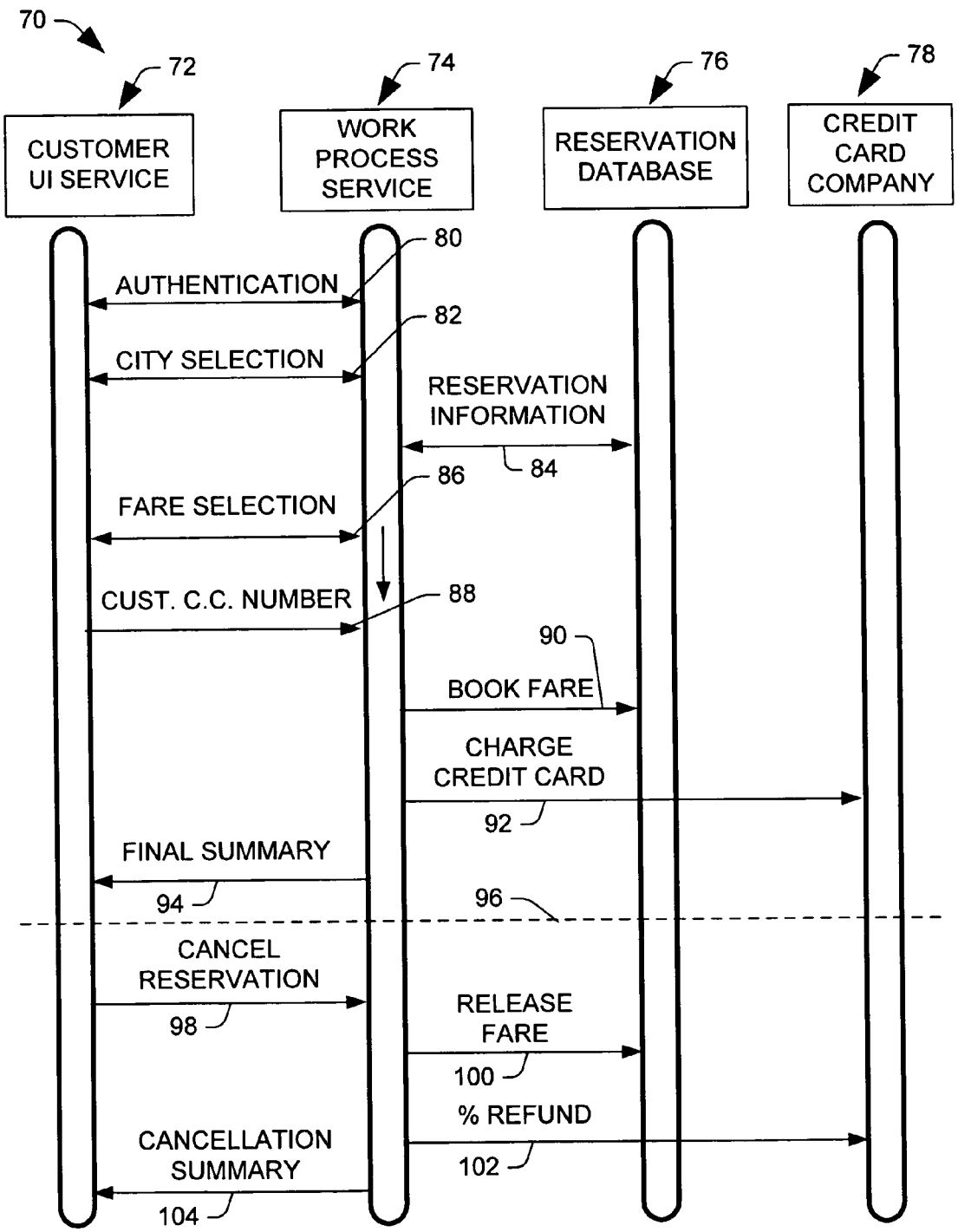
FIG. 4 is a schematic illustration of an exemplary workflow.

In view of the exemplary system shown and described above, methodologies that may be implemented in accordance with the present invention will be better appreciated with reference to FIGS. 2-4. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

FIG. 2 illustrates a method 30 for executing a schedule including hierarchical transactions. The methods illustrated and described hereinafter, can be embodied in a computer-readable medium, (not shown), having computer-executable instructions for performing methods in accordance with the present invention. In a nested transaction architecture prior art methods and systems commit a sub-transaction, thereby allowing data associated therewith to be unlocked, only when an ultimate ancestor transaction (e.g., "root" transaction) has committed.

According to the present invention, a hierarchical transaction commits when it has successfully completed, regardless of whether it's ultimate parent or root transaction has committed. As a result, data associated with an action can be selectively unlocked, (e.g., access thereto allowed to programs outside the schedule) when the action's immediate parent transaction commits. By this method, the outside world need not wait for the root transaction to commit in order to access data associated with the action, thereby reducing average time applications, programs, etc. spend waiting to access locked data. Hierarchical transaction boundaries established by a user while defining the schedule can be employed at run-time to determine when a hierarchical transaction commits, and thus when the data associated therewith can be unlocked.

Execution of an action within a schedule begins at 32 wherein an action is initialized. A context can be associated with the action if the action is grouped or defined as a transaction, and an exception handler associated with the context. One or more compensation handlers can be associated with the exception handler. The exception handler provides rollback and/or compensation with an aborted action and/or transaction, while the compensation handler provides rollback and/or compensation for transactions that have already committed.

The data associated with an action can have been locked prior to execution of the action, for example, upon beginning execution of an action, when the immediate parent transaction began execution, or when the ultimate parent or "root" transaction began execution. While the data is locked, no other actions, programs, etc., can access the data. In this way, data coherency is maintained with respect to the current action. At 34, a determination is made as to whether the action has completed, and if so, decision 36 determines whether the current action has aborted or completed successfully. If the current action has aborted, the method 30 proceeds to 40, wherein the parent transaction is aborted. At 42, selective compensation methods can be employed to facilitate data validity and/or coherency.

The selective compensation actions are invoked by the exception handler. The exception handler is invoked when there is a fault that terminates the execution of the action prematurely. This can occur as a result of a fault response from an invoked service, a programmatic fault (explicitly raised exception) within the action, or an implicit fault that occurs when the enclosing transaction faults. The exception handler corrects for the aborted action. The exception handler can invoke one or more compensation handlers, which provides the associated compensation relating to transactions that have already committed or completed.

Alternatively, if the current action has successfully completed at 36, decision 38 determines whether there are more actions within the parent transaction. If yes, the next action is obtained at 44, and execution thereof proceeds at 32. If no other actions remain in the parent transaction at 38, the parent transaction commits at 46, which results in the data associated with the current action, as well as other actions within the parent transaction being unlocked. Thereafter, the unlocked data is accessible by the outside world, including programs, database access tools, other schedules, etc.

Referring now to FIG. 3, another aspect of the invention is illustrated including a method 50 for executing a schedule wherein schedule state information is selectively stored to a storage medium based on transaction boundaries. Such a method provides a user fine-grained access to such information using database query tools and the like. Fine-grained data access can be advantageous where a user needs to know whether a hierarchical sub-transaction has completed successfully while an ultimate parent or "root" transaction is still executing.

A parent transaction begins execution in 52. A context can be associated with the parent transaction, and an exception handler associated with the context. One or more compensation handlers can be associated with the exception handler. The exception handler provides rollback and/or compensation with an aborted action and/or transaction, while the compensation handler provides rollback and/or compensation for transactions that have already committed.

At 54, schedule state information (such as, for example, the current state of actions and/or transactions within the schedule) associated with the parent transaction is stored to a storage medium. Such information can inform a user, for example, which transactions within the schedule are completed, which have aborted, which are executing, and/or which are awaiting execution. The storage medium (not shown) can be a non-volatile memory. However, any type of memory storage can be utilized and is contemplated as falling within the scope of the present invention. Thereafter, the actions and/or transactions within the parent transaction are executed at 56. It is noted that queries to the schedule state information in the storage medium at this point can determine that the parent transaction is currently executing.

During execution of the parent transaction, if a fault is detected at 58 (e.g., any hierarchical transactions or actions within the parent transaction abort), decision 58 transfers execution to 60 where the parent transaction aborts. At 62, selective compensation methods can be employed to facilitate data validity and/or coherency. The selective compensation methods are invoked by an exception handler associated with the parent transaction. The exception handler corrects for any aborted action and/or transaction. The exception handler can invoke one or more compensation handlers, which provides the associated compensation relating to transactions that have already committed or completed.

If no hierarchical transactions or actions within the parent transaction abort at 58, decision 64 determines whether all of the hierarchical transactions and actions within the parent transaction have been completed. If not, execution returns to 56. When all of the hierarchical transactions and actions associated with the parent transaction have been completed, the schedule state information is again stored in the storage medium at 66. While the schedule state information has been illustrated in FIG. 3 as being stored in or transferred to the storage medium both at the beginning and ending of a transaction, it will be recognized by those skilled in the art that such information can alternatively be stored in or transferred to the medium only at the end of the transaction within the invention.

By the method of FIG. 3, the user defined transaction boundaries are employed to store schedule information in a storage medium, whereby the granularity of the information accessible from the storage medium can be as fine as the user desires. For example, where a user defines many hierarchical or other transaction boundaries in a schedule, the information about the schedule state available from the storage medium will be more specific than previously possible, thus providing better execution monitoring capabilities at runtime. It is worth noting that an aspect of the invention provides for a retry of the failed actions (or sub-transactions) with certain user-defined parameters (e.g., like number of times to retry, time between retry, etc.). This provides the user of the application with a method to overcome temporal failures within a long-running transaction (e.g., temporary unavailability of a storage medium when an action (or a set of actions) commits its state). It would be inefficient for this to terminate a root transaction, which has been executing for weeks (or even months).

It would also be noted by those skilled in the art that this invention provides a mechanism for handling hierarchical transactions but is finely tunable by the user of such an application to have more fine-grained control of the running actions (e.g., tuning the schedule or other transaction to continue processing even though one or more sub-transactions have aborted). This enables the user to handle errors in a manner conducive to the user's specific application.

Referring now to FIG. 4, an exemplary interactive workflow 60 is illustrated, wherein a customer selects and purchases an airline fare through a customer user interface (UI) service 72 using a work process service 74. The customer is provided with an authentication service 80, which authenticates the user and generates a passenger identification number. The user is then provided with a city selection 82, so that the user can select the departure city and destination city. The work process service 74 then accesses a reservation database 76 to retrieve reservation information 84 relating to the selected departure and destination cities. The work process service 74 then provides the customer UI service 72 with a fare selection 86 relating to the selected destination and departure cites. The customer then provides a customer credit card number 88 to the work process service 74 through the customer UI service 72. The work process service 74 then provides a book fare request 90 to the reservation database 76. The work process service 74 then communicates with a credit card company 78 to facilitate a customer credit card charge 92. A summary 94 is then provided to the customer through the customer UI service 72 by the work process service 74.

After an extended period of time (e.g., long running transaction), a cancellation procedure 96 is invoked by the customer. The cancellation procedure 96 includes a cancel reservation request 98 from the customer UI interface 72 to the work process service 74. The work process service 74 then transmits a release fare message 100 to the reservation database 76. The reservation database 76 can then make the fare available to other customers. The work process service 74 then calculates a refund based on the time the cancellation was made with respect to the travel data of the booked fare. A percentage refund 102 is then provided to the credit card company 78. The work process service 74 then provides a cancellation summary 104 to the customer through the customer UI service 72.

Workflows such as that of the flow diagram of FIG. 4 can be defined in the form of a schedule for execution in a computer system. A schedule can include a set of actions having specified concurrency, dependency, and transactional attributes associated therewith. Each schedule has an associated schedule state, which includes a definition of the schedule, the current location within the schedule, as well as active or live data and objects associated with the schedule. Within a schedule, transaction boundaries can exist based on groupings of actions. In this regard, a transaction can encompass individual actions, or transactions, or groups thereof. As discussed further hereinafter, actions can be grouped into sequences, which are executed in serial fashion, as well as tasks in which the actions are executed concurrently. Based on the groupings, therefore, concurrency can be resolved for the actions and transactions within a schedule.

Actions correspond to the work that is done within a schedule and are the basic unit of composition therein. According to the invention, such actions can include attributes relating to latency and compensation, either alternatively or in combination, within the context of a schedule. In addition, concurrency of action execution can be embedded into a schedule via one or more concurrent constructs, for example, a task construct. Two types of actions exist; sink actions and source actions. Sink actions send externally originating stimuli to a schedule, thereby allowing external programs to advance the schedule state. These stimuli can be an event, a message, or a call. In the case of an event, the running schedule acts as a subscriber. Where the first action in a schedule is a sink action, a new instance of a schedule will be instantiated as a result of a message (or call or event) being received.

Source actions drive method calls on components. Such source actions typically instantiate a component, (create an instance of the component, unless the action refers to a pre-created instance of the component), call a method on the instance, and subsequently release the reference to the instance if it is not used later in the schedule.

When an application executes a schedule, an instance of a scheduler engine is created and the schedule and an associated binding are loaded. Actions, moreover, can include information regarding the expected or actual completion time or latency in accordance with the invention. This information can be embedded in the schedule definition when the schedule is being defined or when a binding is being created. In addition, latency attributes can be provided dynamically at runtime based on historical or predictive information about the latency of the action.

Ports are used by a schedule to define references to a component instance. Ports can be of type sink or source. Sink ports are entry points into a schedule for an external event to advance the schedule state. Source ports are used to send messages. A source port can also map to a method call by the schedule instance on a component instance that the port is bound to. References in a schedule to a port are associated with or bound to references to a message queue (or a component) by a process called binding. The schedule is thus created with reference to particular technologies and components that implement the desired behavior. Different bindings can be created for a single schedule, each binding specifying the particular components to be used in a given application. In practice, a schedule can be defined for an inter-business process, and reused for several combinations of businesses, wherein a different binding is created for each company implementing the process. The schedule itself is therefore portable.

Schedules can be created or defined using various workflow tools including a scheduler language and graphical user interfaces. The schedule definition includes port references, action definitions, task and sequence definitions, transaction definitions including definitions of action groupings within transactions, transaction boundaries, compensation parameters or attributes, and concurrency information. Constants can be provided to a schedule as initialization parameters by building the constants into the schedule as instance parameters when the schedule is instanced, as well as by invoking a component associated with a source action within the schedule. In the latter case, the parameters of the invoked method represent the initialization parameters.

Once a schedule is defined, a binding is created which resolves references in the schedule to ports into references to specific components. As discussed above, several different bindings can be created for a single schedule, according to the specific technology with which the schedule is to be employed. Particular bindings are created according to the specific technology using binding tools such as software programs.

FIG. 5 illustrates an example of the business workflow programming language syntax 110 defined in Extended Backus-Naur Form (EBNF). The syntax 110 includes schedule, ports, messages, contexts and process syntax. FIG. 6 illustrates schedule syntax 120 in EBNF. A schedule first declares ports, messages and contexts and then describes an ordering of actions. Ports are named abstract locations where messages are sent to and received from. Messages are named abstract data segments sent to and received from ports. Contexts are named escape points associated to some unit of work such as a single action or process contained in a schedule. The context process provides a framework for error-handling (exceptional handling and compensation handling).

A context is a label indicating where control is to be transferred when context is invoked (e.g., return). Optionally, a context can be a transaction indicating atomicity of the associated process or action. Additionally, an optional process form can accompany a transactional context to describe compensating behavior required to undo effects of the process transaction associated with the context. FIG. 7 illustrates context syntax 130 in EBNF. Context allows the user to implement compensation tasks associated with transaction failures.

Figure 8:
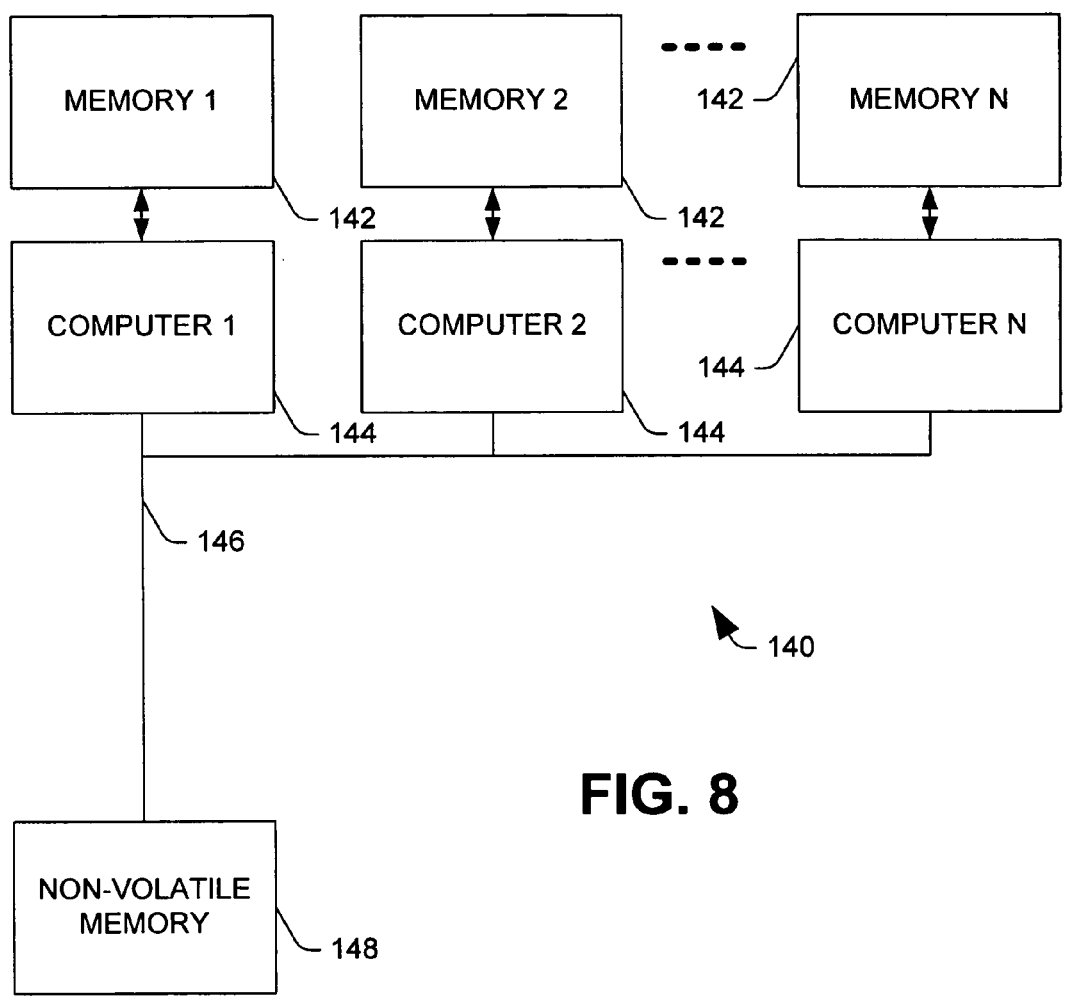
FIG. 8 illustrates a block diagram of a system for performing the methods in accordance with the present invention.

FIG. 8 illustrates a system 140 of networked computers including computer 1 to computer N (collectively referenced by number 144). The computers 144 each have a memory 1 to memory N (collectively referenced by number 72) associated therewith, respectively. A network 146 connects computers 144 to one another as well as to a non-volatile storage memory unit 148. A workflow application, not shown, which is executed by and execution engine residing on computer 1 can include an exemplary schedule instance, as described in FIG. 8. Various transactions can be executed at one or more of the computers 144 by one or more execution engines. Custom error-handling routines can be provided with associated contexts defined in the schedule in accordance with the present invention. Additionally, default error-handling routines can also be provided for contexts without custom error-handling routines by the error-handling framework of the present invention.

Figure 9:
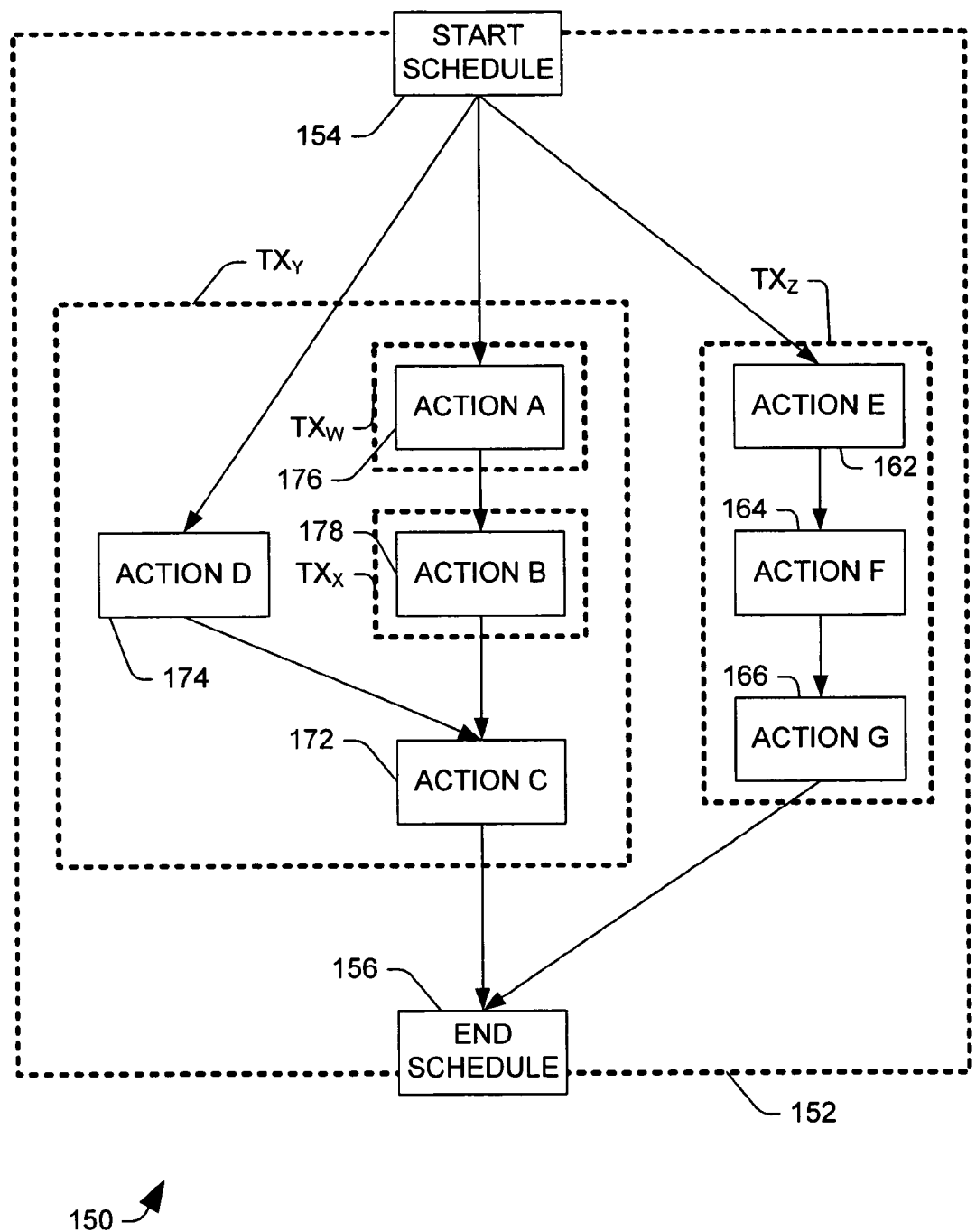
FIG. 9 is a block diagram illustrating an exemplary schedule having nested transactions in accordance with the invention.

In FIG. 9, a schedule 150 is illustrated graphically including a root (ultimate parent) transaction 152, with a start schedule block 154 and an end schedule block 156. Blocks 154 and 156 are shown merely for illustration, and need not themselves be actions. Within hierarchical transaction 152 are sub-transactions $TX_Y$, and $TX_Z$, which can execute concurrently. Hierarchical transaction $TX_Z$ includes actions E, F, and G, 162, 164, and 166, respectively, which are organized into a sequence in which the actions E 162, F 164, and G 166 execute sequentially. Hierarchical transaction $TX_Y$ includes sub-transactions $TX_W$, and $TX_X$ in a sequence. The sequence including hierarchical transactions $TX_W$ and $TX_X$ executes concurrently with action D 174 within transaction $TX_Y$.

Concurrently executing groupings of actions and transactions in this regard are called tasks. Thus action D 174 forms a task with the sequence of transactions $TX_W$ and $TX_X$, within the hierarchical transaction $TX_Y$. Action C 172 executes after this task has completed, e.g., after the completion of both action D 174 and the sequence of hierarchical transactions $TX_W$ and $TX_X$. Similarly, hierarchical transaction $TX_Y$ forms a task with the hierarchical transaction $TX_Z$ within the ultimate parent or "root" transaction 152. Hierarchical transactions $TX_W$ and $TX_X$ include actions A 176 and B 178, respectively. According to the above example, each hierarchical transaction in FIG. 8 includes a transaction boundary illustrated as a dashed line. However, it will be recognized that other examples are possible within the scope of the invention, wherein some transactions include transaction boundaries, while others do not.

The schedule defined by a user includes hierarchical transaction boundaries such as those illustrated, the position of which is determined by logical grouping of hierarchical transactions and actions within the hierarchy of the schedule. The groupings are determined according to the desired execution characteristics of the components of the groups. For example, the user creating the schedule can know that transactions $TX_Y$ and $TX_Z$ of FIG. 9 can execute independently because neither transaction needs to access data or results created or modified by the other. Consequently, the user can group these two transactions $TX_Y$ and $TX_Z$ as a task, wherein the transactions execute concurrently.

Conversely, the user can know that action C 172 requires that the results and/or data modifications performed by the sequence of transactions $TX_W$ and $TX_X$ as well as that of action D 174 be completed prior to execution of action C 172. Thus, the user can group these components into a sequence as shown in FIG. 9, wherein transactions $TX_W$ and $TX_X$, and action D 174 execute before action C 172. Likewise, action D 174 can be grouped in a task with the sequence of transactions $TX_W$ and $TX_X$ where it is known that neither the action D 174 nor the sequence of transactions $TX_W$ and $TX_X$ rely upon the other's data or results in order to properly execute.

In addition to data interdependency issues, a user can group actions and/or hierarchical transactions within a schedule for monitoring purposes. For example, in accordance with the present invention, schedule state information can be stored in a storage medium at hierarchical transaction boundaries. A user can thus desire fine-grained monitoring capabilities with respect to certain actions at run-time. In this situation, the user can define certain hierarchical transactions to include a single component action, such as transactions $TX_W$ and $TX_X$, in FIG. 9, each of which include single actions A 176 and B 178, respectively. In this regard, it will be appreciated that actions A 176 and B 178 could have been defined as within hierarchical transaction $TX_Y$ without the sub-transactions $TX_W$ and $TX_X$. Moreover, the user can define the hierarchical transaction boundaries, and although each transaction can employ such a transaction boundary, each transaction need not have such a boundary.

In the illustrated example, the use of the hierarchical sub-transaction transaction boundaries for transactions $TX_W$ and $TX_X$, advantageously provides for additional storage of schedule information to a storage medium at run-time, whereby, for example, a user can monitor the schedule execution to determine that the hierarchical transaction $TX_W$ has committed, and that the transaction $TX_X$ is pending. Without the inclusion of hierarchical transaction boundaries in the schedule for sub-transactions $TX_W$ and $TX_X$, the user can only monitor the execution of the parent transaction $TX_Y$ as a whole. Therefore, a user defining a schedule in accordance with the present invention, can define logical hierarchical transaction boundaries according to monitoring as well as data interdependency considerations, as can be desired.

Figure 10:
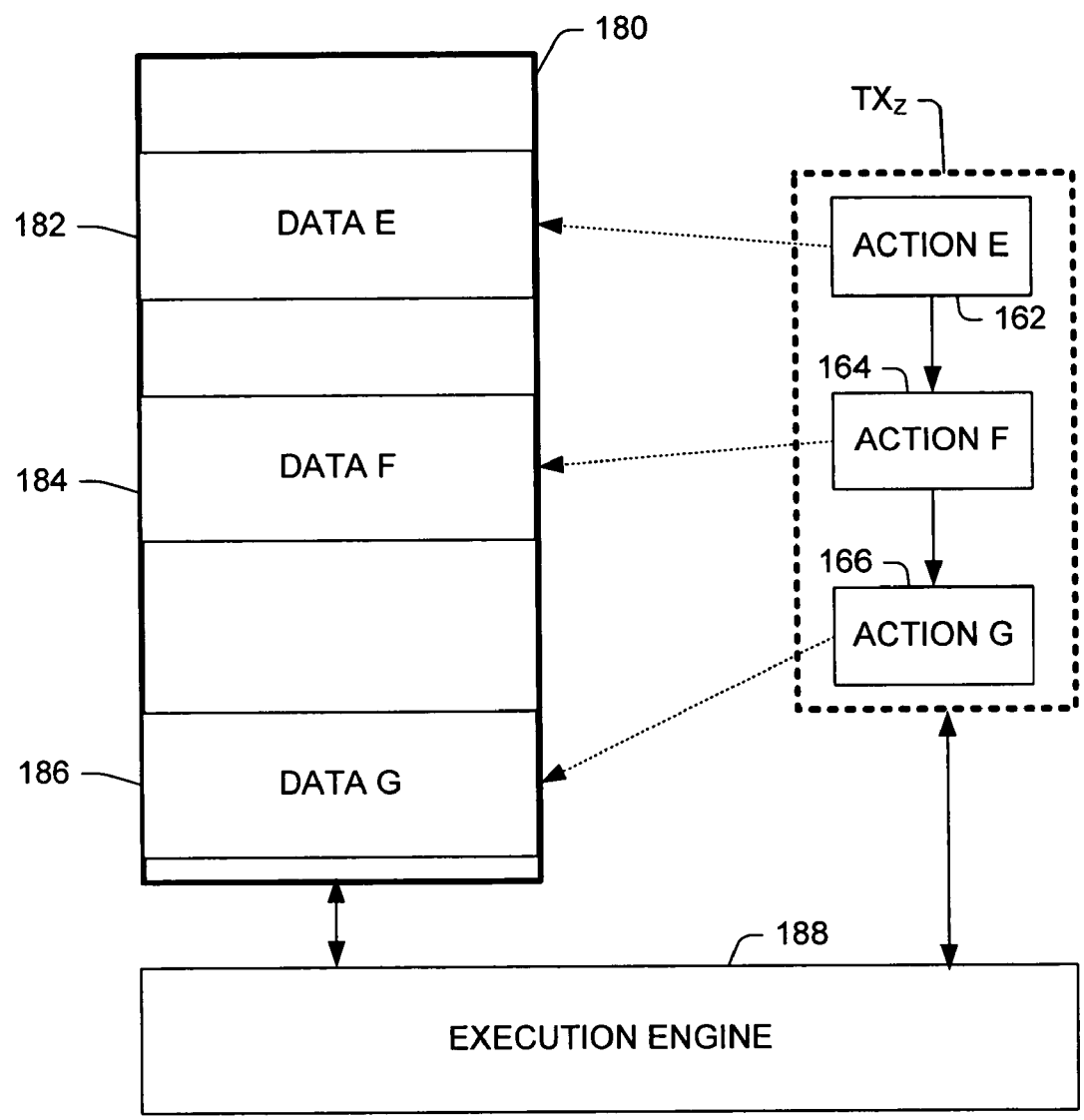
FIG. 10 is a block diagram illustrating one transaction of FIG. 8, and data associated therewith.

Referring to FIG. 10, transaction $TX_Z$ of FIG. 9 is illustrated together with data associated with component actions E 162, F 164, and G 166 which form a sequence within the transaction $TX_Z$. The associated data is illustrated as residing within a memory 180 at execution by an execution engine 188 residing on a computer, such as any of the memories and computers illustrated in FIG. 8. In particular, data E 182 is associated with action E 162, data F 184 is associated with action F 164 and data G 186 is associated with action G 166, respectively. Those skilled in the art will appreciate that while the data associated with the actions are shown to be one contiguous block of data in memory 180, the data can be located at a plurality of locations within the memory 180, and/or within many different memory units such as, for example, the memories illustrated in FIG. 8. Moreover, it will be recognized that messages, as well as data, can be associated with an action in a schedule, and that the selective locking and unlocking of data resulting from the commit rule methods discussed herein apply to data as well to messages and other information associated with an action or transaction.

Referring also to FIG. 2, a method of executing a schedule is illustrated wherein the transactions boundaries are used to commit hierarchical transactions and thereby to selectively restrict access to data associated with an action within the schedule. Using the schedule shown in FIG. 9 as an example, the details of the inventive method will now be described. At the start of the schedule 150, the action E 162 begins execution at 32 (FIG. 2). During execution of the action E 162, access to the data E 182 is denied to programs, actions, etc., outside of the schedule 150. The data locking can be implemented by the computer 144 of FIG. 8, or by other appropriate resource managers (not shown).

In particular, the computer 144 can run an application program associated with the schedule execution, which provides for selective locking of data. The completion of the current action E 162 is tested at decision 34 (FIG. 2), and if completed, 36 (FIG. 2) determines whether the action E 362 aborted. If the action E 162 aborted for any reason, the hierarchical transaction $TX_Z$ associated with the action E 162 is itself aborted at 40 (FIG. 2). The data 182 associated therewith is compensated at 42 (FIG. 2), as will be discussed further hereinafter. After selective compensation, the data 182 can then be unlocked (e.g., access thereto is allowed to other programs and/or actions).

If the current action E 162 has completed successfully, then decision 38 (FIG. 2) determines whether there are other unfinished actions or transactions within the hierarchical parent transaction $TX_Z$. In this regard, it will be appreciated that the hierarchical transaction $TX_Z$ in FIGS. 9 and 10 is the parent transaction with respect to actions E 162, F 164, and G 166. In such hierarchical transactions as are illustrated, one or more sub-transactions are included within the hierarchical transaction boundary of another hierarchical (parent) transaction. The outer-most hierarchical transaction boundary is that of the ultimate parent or "root" transaction. Actions can be said to be associated with each other or with transactions, where they are each within the same ultimate parent or "root" transaction's transaction boundary.

After successful completion of action E 162, the decision 38 of FIG. 2, determines that other actions (actions F 164 and G 166) remain within the hierarchical parent transaction $TX_Z$ at 38. Accordingly, the next action F 164 is obtained according to the schedule in 44 (FIG. 2), which begins execution at 32 (FIG. 2). Execution proceeds through 34, 36, and 38 (FIG. 2), where it is determined that action F 164 has successfully completed, and that action G 166 remains within the hierarchical transaction $TX_Z$.

Once action G 166 has been executed in similar fashion according to 32, 34, and 36, decision 38 determines that no more actions or transactions need execution within the hierarchical parent transaction $TX_Z$. Consequently, the hierarchical transaction $TX_Z$ is committed at 46 (FIG. 2). Once the hierarchical transaction $TX_Z$ has committed, the data 182, 184, and 186 associated with the actions E 162, F 164, and G 166 of the hierarchical parent transaction $TX_Z$ can thereafter be unlocked. Had any of the component actions E 162, F 164, or G 166 aborted, 40 and 42 would have provided selective compensation of the affected data. For example, a context can be associated with hierarchical transaction $TX_Z$. Additionally, an exception handler and a compensation handler can be associated with the context. Custom or default handlers can execute to mitigate for a fault associated with hierarchical transaction $TX_Z$. In either case, once the data has been unlocked as a result of the commit rule or the compensation rules, other actions, programs, schedules, etc. can access the data 182, 184, and 186.

It will be noted at this point that the data 182, 184, and 186 associated with the component actions E 162, F 164, and G 166, respectively, remains locked until the immediate parent transaction 116 commits. Therefore, if the actions E 162 and F 164 had completed, and the action G 166 remained pending for a long time, outside entities, such as programs, objects, other actions, or schedules, etc. must wait for completion of this long latency action before being allowed to access the data 182 and/or 184 associated with the completed actions E 162 and F 164, respectively. If greater resolution in data availability is desired, a user could have defined individual transaction boundaries around each of the actions E 162, and F 164, as will be further appreciated in the discussion of transaction $TX_Y$ of FIG. 9 and FIG. 11.

Figure 11:
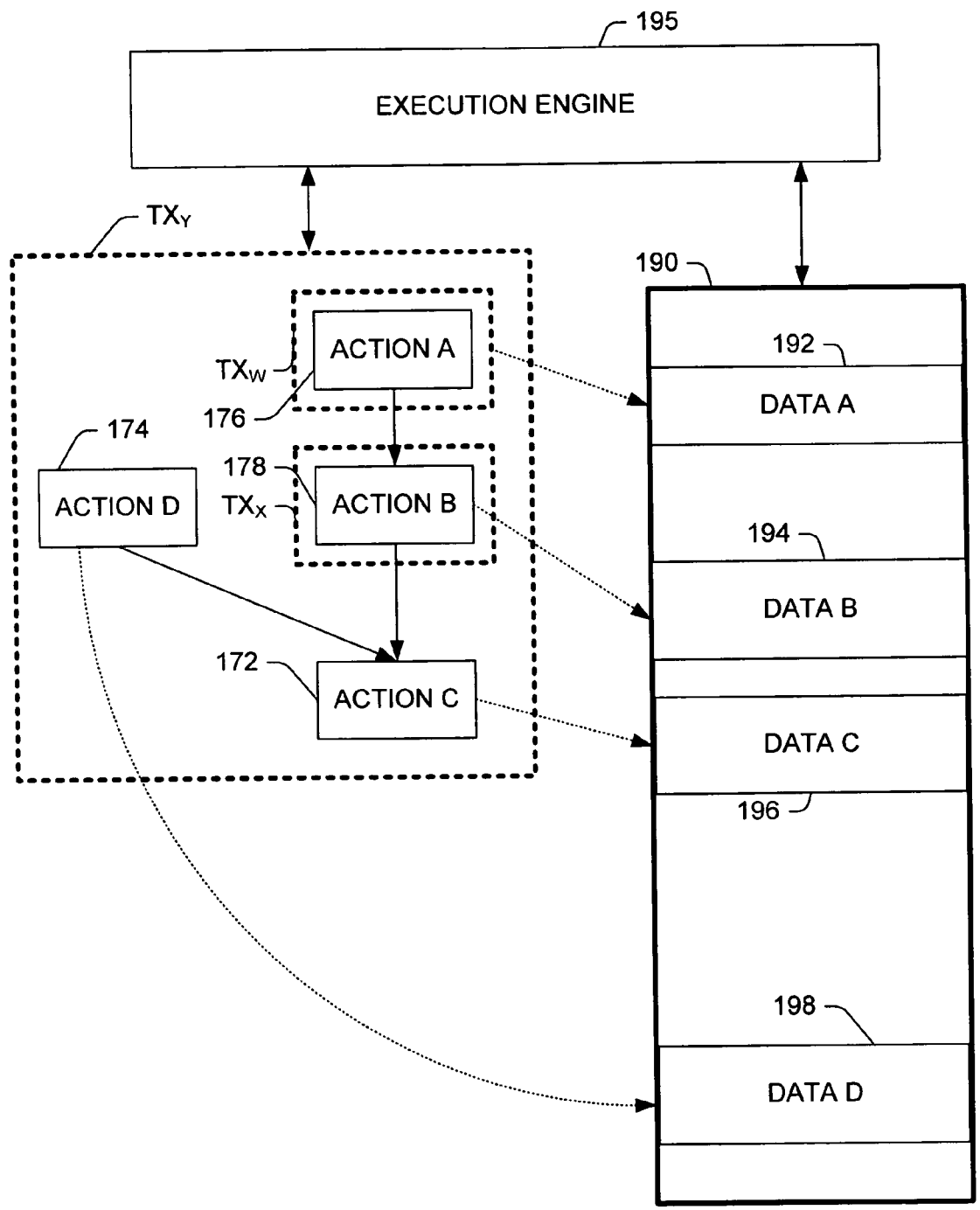
FIG. 11 is a block diagram illustrating another transaction of FIG. 8, and data associated therewith.

Referring now to FIGS. 2, 9, and 11, FIG. 11 illustrates the transaction $TX_Y$ of FIG. 9, including sub-transactions $TX_W$ and $TX_X$ as well as a portion of a memory 190, similar to that illustrated in FIG. 9, wherein data portions in the memory 190 are shown associated with actions within transaction $TX_Y$. The associated data is illustrated as residing within a memory 190 at execution by an execution engine 195 residing on a computer, such as any of the memories and computers illustrated in FIG. 8. In particular, data A 192 is associated with action A 176, data B 194 is associated with action B 178, data C 196 is associated with action C 172, and data D 198 is associated with action D 174. As discussed above with respect to FIG. 11, the data associated with the actions C 172, D 174, A 176, and B 178 can include messages as well as data portions within blocks of memory, and the data associated with an action need not reside within a contiguous portion of a specific memory.

The action A 176 begins execution in 32 of FIG. 2, and execution proceeds through 34 and 36. Assuming the action A 176 completes successfully, the decision 38 determines that no other actions remain within the transaction boundary of hierarchical sub-transaction $TX_W$. Consequently, the hierarchical sub-transaction $TX_W$ commits at 46 (FIG. 2), thereby allowing the data 192 associated with the successfully completed action A 176 to be unlocked. The same method is employed for execution of the action B 178 with respect to its associated data 194. Assuming the action B 178 does not abort, execution thereof proceeds through 32, 34, and 36, whereupon the decision 38 determines that there are no other actions within the hierarchical sub-transaction $TX_X$. Accordingly, the hierarchical sub-transaction $TX_X$ commits at 46.

In FIGS. 9 and 11, the action D 174 can be concurrently executing with the hierarchical sub-transactions $TX_W$ and $TX_X$ (e.g., the hierarchical sub-transactions $TX_W$ and $TX_X$ form a task with action D 174). Thus, action D 174 can complete before, after, or at the same time that the hierarchical sub-transactions $TX_W$ and $TX_X$ complete. Action D 174 executes in the same manner as actions A 176 and B 178 in accordance with the diagram of FIG. 2. Assuming the action D 174 does not abort 38 determines that there are other actions (action C 172, and possibly actions A 176 and B 178), which remain within action D 174's hierarchical parent transaction $TX_Y$. Thus, the data D 198 associated with the action D 174 is not unlocked until these other actions have also completed.

It should be noted at this point, that had a logical transaction boundary been provided which included only action D 174, the data D 198 associated therewith, would have been unlocked via the commit rule of the invention prior to the completion of all the actions within the hierarchical transaction $TX_Y$, similar to the early unlocking of the data 192 and 194 by virtue of the hierarchical sub-transaction boundaries $TX_W$ and $TX_X$ provided in the schedule around the actions A 176 and B 178, respectively. In this example, therefore, it is seen that the user who defines the hierarchical transaction boundaries in a schedule can selectively determine when hierarchical transactions can commit, and thereby provide for early data unlocking on an action-by-action basis. The invention thus provides significant advantages in data accessibility in the context of, for example, long running transactions.

Once both action D 174 and the hierarchical sub-transactions $TX_W$ and $TX_X$ have completed, action C 172 is executed according to the method of FIG. 2. If successful, decision 38 determines that no incomplete actions remain in the hierarchical parent transaction $TX_Y$, whereupon the parent transaction $TX_Y$ commits, allowing the data 198 and 196 associated with the actions D 174 and C 172, respectively, to be unlocked.

Referring again to FIG. 9, since all the actions within the root or ultimate parent hierarchical transaction 152 have successfully completed, the parent transaction 152 can now, itself, commit. By virtue of the logical transaction boundaries within the schedule definition, the selective locking and unlocking of data associated with an action within the schedule can be achieved, whereby the user can provide for early unlocking of data based on the completion of the associated action, and the hierarchical transaction boundaries.

In the example discussed above with respect to FIG. 9, it is seen that had hierarchical transaction $TX_Y$ committed before transaction $TX_Z$, the data 196 and 198 (as well as the previously unlocked data 192 and 194), would be unlocked prior to commission of transaction $TX_Z$. Where, for example, the latency or execution time for the action F 164 is particularly long, the structuring of hierarchical transactions $TX_Y$ and $TX_Z$ is advantageous since the data 196, 198, 192 AND 194 associated with the actions within hierarchical transaction $TX_Y$ can be unlocked without having to wait for the long latency action F 164 to complete. This allows other programs, actions, etc., outside the schedule 150 to access the data 196, 198, 192 and 194, earlier than in the prior art systems and methods, consequently improving overall system performance. Long running transactions, and long latency actions, are but one example of the considerations to which the flexibility provided by the present invention can be employed.

The method described above for committing hierarchical transactions provides for relaxation of the isolation property of ACID transactions. In this regard, the assurance of data validity and/or coherency can be sacrificed if no method for data compensation is provided, when a hierarchical transaction or action aborts. In accordance with another aspect of the invention, selective compensation methods are provided, whereby the data associated with an action can be compensated based on the abortion of another action within the schedule, as well as the transaction boundaries therein, as discussed hereinafter.

Compensation can be used to recover or reconstruct data, which has been modified in the course of execution of a transaction, which subsequently failed or aborted. Such transactions can be referred to as compensated transactions, which can comprise, for example, hierarchical compensated transactions (e.g., default behavior) and/or custom compensated and ordered transactions. Selective compensation can be useful when certain actions within a transaction have already committed and modified their data, and subsequently, another action within the transaction aborts or fails. A user can want the system to reconstruct the data modified by the committed actions, prior to aborting the transaction.

Further, it can be advantageous or desirable to send messages to other schedules, transactions, etc. to indicate that an action has aborted, or that data previously modified, is now to be restored, or even to indicate that the data will not be restored. The flexibility of selective compensation allows actions to commit their respective data as soon as their parent transaction commits, without necessarily waiting for their hierarchical ultimate parent or root transaction to commit—this frees access to the data for use by other programs, actions, transactions, etc., which can substantially improve system efficiency, particularly where long running transactions are involved.

Selective compensation provides a user with the ability to compensate for aborted or failed actions, etc., either by recreating the data that has or can have been modified, or by notifying other actions, programs, schedules, etc. that the data may have been unreliable. As opposed to the conventional methods, the present invention provides a flexible compensation method, which can include conventional automatic roll back, but is not limited thereto. Consequently, the aggregate time that data is locked can be decreased, and other objects are allowed access to data much sooner than was possible in the prior art. The present invention relaxes the prior art isolation requirement and allows data associated with one or more actions within a hierarchical root or ultimate parent transaction to be unlocked upon commission of a sub-transaction. Further, the present invention addresses the potential problem of unreliable data associated with unlocked actions using a method of selective compensation, as will be discussed in greater detail below.

In this context, compensation can include sending messages, activating or instantiating objects or actions, rolling back the data by undoing the data manipulation performed by the committed actions, or combinations of these, or even doing nothing. Some examples of compensation might include broadcasting messages to notify other programs, objects, etc., that the suspect data can not be reliable, determining which objects, etc., have accessed the subject data after commission by the committed actions and notifying those objects that the data is suspect, or rolling back the data if it is determined that no other entities have accessed the data subsequent to commission by actions within the current transaction.

The compensation can be performed according to a compensation routine, a list of things to do, or a list of objects to activate or instantiate, etc. This selective compensation allows relaxation of isolation within hierarchical transaction boundaries, resulting in system efficiencies due to increased access to data. Accordingly, aggregate data locking in a given system will be of a shorter duration. Selective compensation further allows reduction in needless compensation where, for example, an action or a transaction does not modify data that will be accessed by other objects.

The selective compensation can be provided by a programmer utilizing the error-handling framework in accordance with the present invention. The error-handling framework facilitates coordination of the invocation of exception and compensation handlers in response to errors in a business workflow process. The error-handling framework facilitates the invocation of exception and compensation handlers in response to errors, including custom ordering of compensation actions, data flow into and out of compensation actions, and management of the process state visible to compensation actions.

A context can be associated with a unit of work, such as a transaction and/or a plurality of transactions defining a process or process form. The context provides a scope for a number of resources and behaviors including data containers, exception handlers and compensation handlers. The error-handling framework provides default exception and compensation handlers in case custom handlers are not provided. Compensation handlers can be parameterized and support both input and output parameters. Long running transactions and contexts can be nested to arbitrary depths. A user defines the exception and compensation handling routines associated with a context based on a business workflow process. An execution engine implements the user defined exception and compensation handling in addition to providing default rules associated with error-handling. The default rules include rules relating to default handlers, exception and compensation propagation, exception and compensation functionality, compensation parameters, compensation data snapshots and in-line service invocation.

Figure 12:
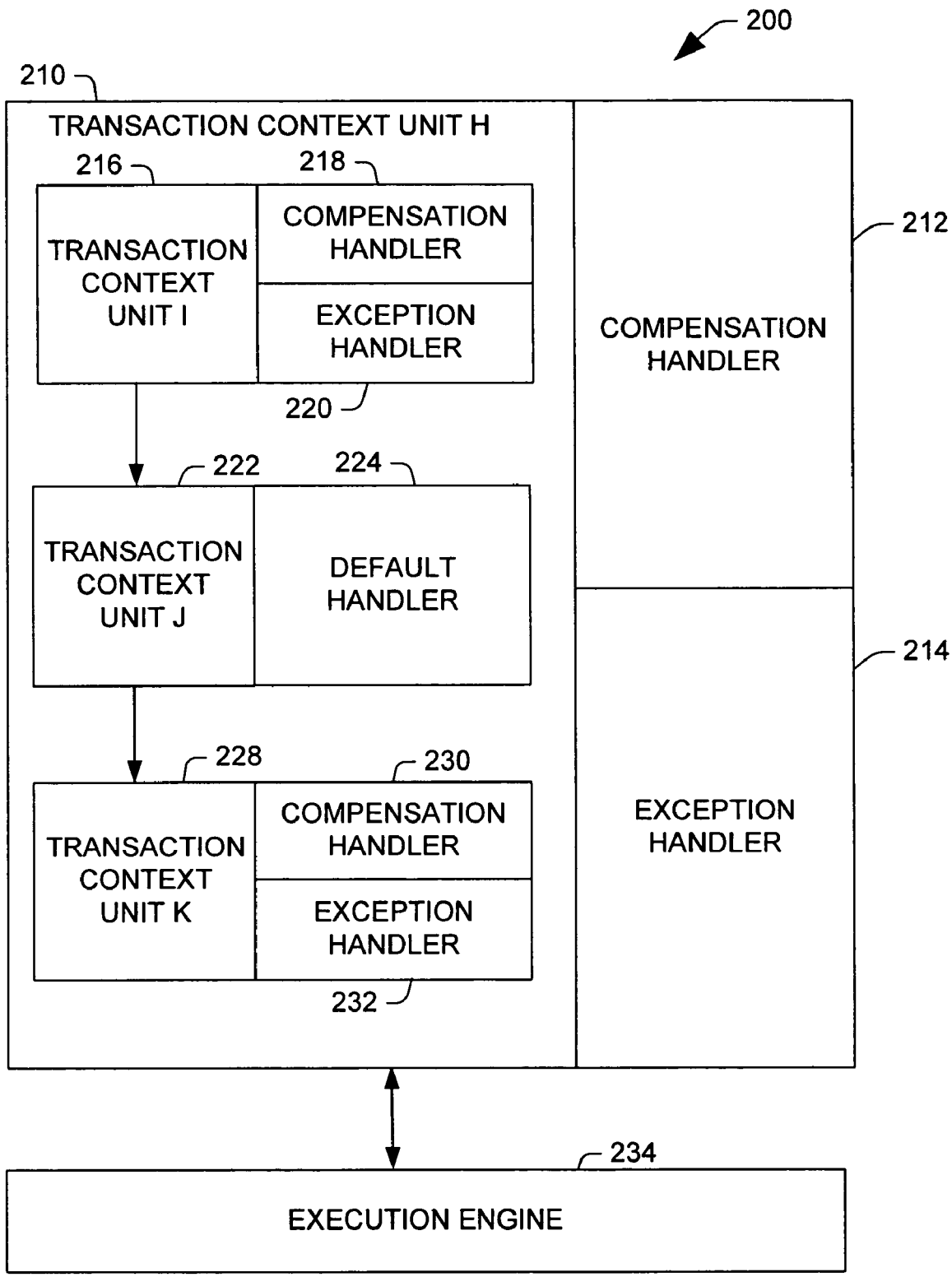
FIG. 12 illustrates a representation of a business workflow schedule employing the error-handling framework in accordance with an aspect of the present invention.

FIG. 12 illustrates a representation of a business workflow schedule 200 employing an error-handling framework in accordance with an aspect of the present invention. The business workflow schedule 200 includes several processes (e.g., process forms) defining units of work or contexts. The units of work or contexts can be transactions or a plurality of transactions. A context is permitted to provide exception and compensation handlers associated therewith. Every context has default exception and compensation handlers in case custom handlers are not provided. An execution engine 234 executes units of work associated with a transaction context in a hierarchical manner, and invokes a corresponding exception handler upon detection of a fault. In the present example of FIG. 12, the units of work are defined as transactions including a parent transaction context unit H 210 with sub-transactions, transaction context unit I 216, transaction context unit J 222 and transaction context unit K 228.

The transaction context unit H 210 has an associated exception handler 214 and an associated compensation handler 212. The transaction context unit I 216 has an associated exception handler 220 and an associated compensation handler 218. The transaction context unit K 228 has an associated exception handler 232 and an associated compensation handler 230. However, the transaction context unit J 222 does not have an associated exception handler or an associated compensation handler. Therefore, the transaction context unit J 222 is provided with a default handler 224 (e.g., exception handler, compensation handler) by the error-handling framework. When an exception or compensation handler is absent at any context, a default handler is installed which runs compensation handlers in the reverse order of the completion of the corresponding transactions. This default behavior is also available as an API for the use of explicitly programmed exception and compensation handlers The execution engine 234 executes the transactions of the business workflow schedule 200 in hierarchical order similar to the schedule described in FIG. 9. If a fault is detected by the execution engine 234, an exception handler corresponding to the executing transaction context is invoked. The invoked exception handler performs routines to mitigate (e.g., rollback data) actions executed by the associated transaction context. The exception handler also calls compensation handlers for sub-transactions, which can call other compensation handlers. The exception handler then propagates to an outer transaction context.

For example, if a fault occurs during execution of transaction context unit K 228, the exception handler 232 will be invoked. The exception handler 232 rolls back or compensates data associated with the transaction context unit K 228. Since the transaction context unit K 228 never completes execution, the compensation handler 230 is never called. Compensation handlers are called to undo transaction contexts. Therefore, since the transaction context unit K 228 never completes, it cannot be undone. The compensation handler 218 associated with the transaction context unit I 216 is invoked to undo the actions associated with the transaction context unit I 216. The default handler 224 associated with the transaction context unit J 222 is invoked to undo the actions associated with the transaction context unit J 222. The exception handler 232 then propagates to the next outer context exception handler 214.

Figure 13:
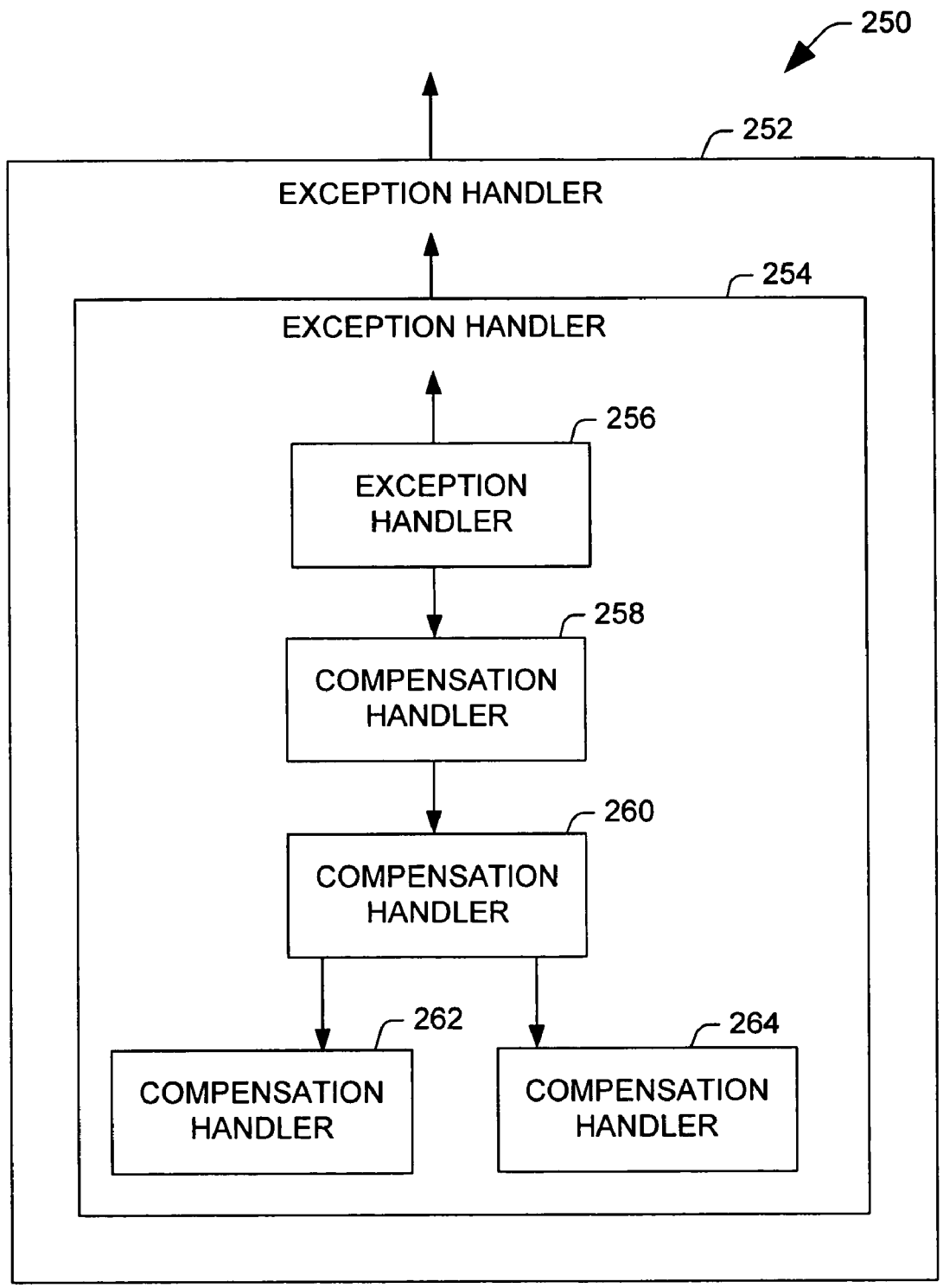
FIG. 13 illustrates an error handler propagation diagram in accordance with an aspect of the present invention.

FIG. 13 illustrates an error handler propagation diagram 250 in accordance with the error-handling framework of the present invention. The exception handlers and compensation handlers are associated with contexts or units of work. An exception handler for a context (explicit or default) is invoked when there is a fault that terminates the execution of the context prematurely. This can occur as a result of a fault response from an invoked service, a programmatic fault (explicitly raised exception) within the context, or an implicit fault that occurs when the enclosing context faults. In the case of enclosing context faults, the implicit faults propagate to all nested levels with active contexts. In case of faults occurring at multiple nesting levels of contexts, exceptions are processed in an inside out manner. The exception handlers of all inner contexts are invoked and completed before the exception handler of the enclosing context is invoked.

As illustrated in FIG. 13, an exception handler 256 is invoked as a result of a fault within a first context. The exception handler 256 then calls a first compensation handler 258 relating to the first context. The first compensation handler 258 executes one or more compensation handling routines, and then invokes a second compensation handler 260 relating to a second context that is an inner context of the first context. The second compensation handler 260 executes one or more compensation handling routines, and then invokes a third compensation handler 262 and a fourth compensation handler 264. The third compensation handler 262 and a fourth compensation handler 264 are inner contexts of the second context. The third compensation handler 262 and a fourth compensation handler 264 execute one or more compensation handling routines, and then return control to the exception handler 256.

The exception handler 256 then propagates to the next level of enclosing context to invoke a second exception handler 254 of a first parent context. The exception handler 254 performs error-handling and compensation similarly to the exception handler 256. The exception handler 254 then propagates to the next level of enclosing context to invoke a second exception handler 252 of a second parent context. The exception handler 252 performs error-handling and compensation similarly to the exception handler 254 and the exception handler 256, until all compensation and exception routines associated with contexts have been executed.

Compensation handlers can be invoked in the exception or compensation handlers of directly enclosing contexts. Thus, an exception handler can be viewed in part as a custom script for compensating the partial work completed in the associated context. Compensation handlers at inner (not directly nested) contexts can be invoked by the compensation handlers for the directly nested contexts. Thus, the exception behavior is able to use the compensation handlers for all completed transactions within its scope, either directly or indirectly.

Figure 14:
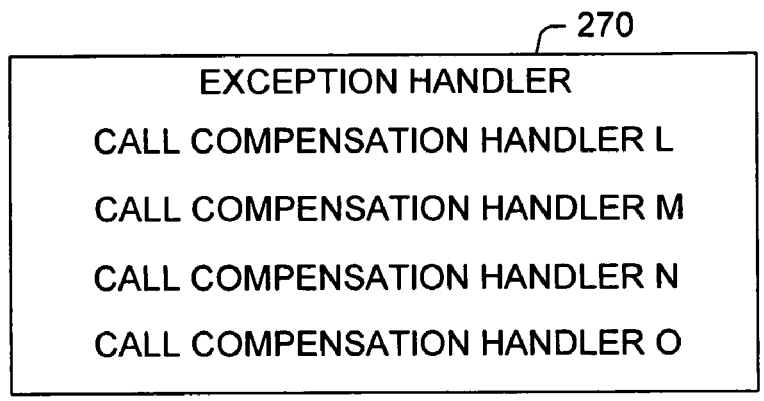
FIG. 14 illustrates an exception handler that calls compensation routines in reverse order of execution of corresponding contexts in accordance with an aspect of the present invention.
Figure 15:
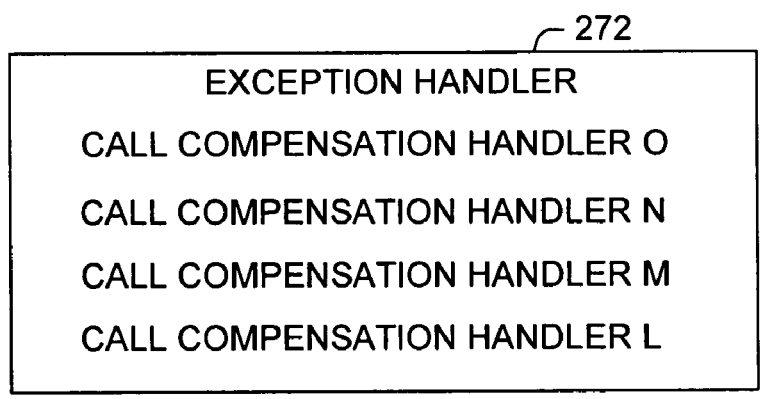
FIG. 15 illustrates an exception handler that calls compensation routines in order of execution of corresponding contexts in accordance with an aspect of the present invention.
Figure 16:
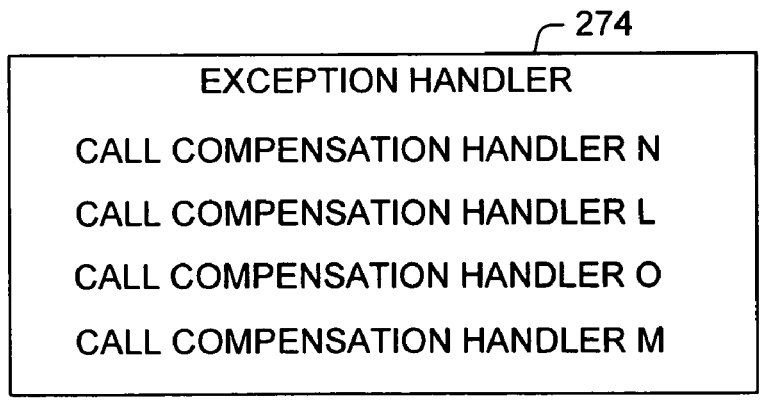
FIG. 16 illustrates an exception handler that calls compensation routines in a specific random order of execution of corresponding contexts in accordance with an aspect of the present invention.

When an exception or compensation handler is absent at any context, a default handler is installed which runs compensation handlers in the reverse order of the completion of the corresponding transaction contexts. However, the present invention facilitates the ordering of compensation handlers in any order desired. FIGS. 13-15 illustrate exception handlers that call compensation handlers by various orderings. For example, assuming a set of transactions execute sequentially as transaction L, transaction M, transaction N and transaction O, and a fault occurs after the completion of transaction O. FIG. 14 illustrates an exception handler 270 that calls the compensation handlers associated with the transaction in order of execution (e.g., compensation handler L, M, N and O), while FIG. 15 illustrates an exception handler 272 that calls the compensation handlers associated with the transaction in reverse order of execution (e.g., compensation handler O, N, M, L). The error-handling framework of the present invention facilitates any ordering of compensation routines if the ordering does not create a fault itself. FIG. 16 illustrates an exception handler 274 that calls the compensation handlers associated with the transaction in a random order of execution (e.g., compensation handler N, L, O and M).

In accordance with an aspect of the present invention, compensation handlers pass and receive one or more parameters. Therefore, calculations can be performed by a compensation handler and/or exception handler at a first business location and passed to a compensation handler and/or exception handler at a second business location. It is also to be appreciated that parameters of compensation handlers can be used to pass data in and out in order to communicate information about the environment to the compensation handler, and to communicate the results of the compensation to the rest of the exception handling behavior.

Figure 17:
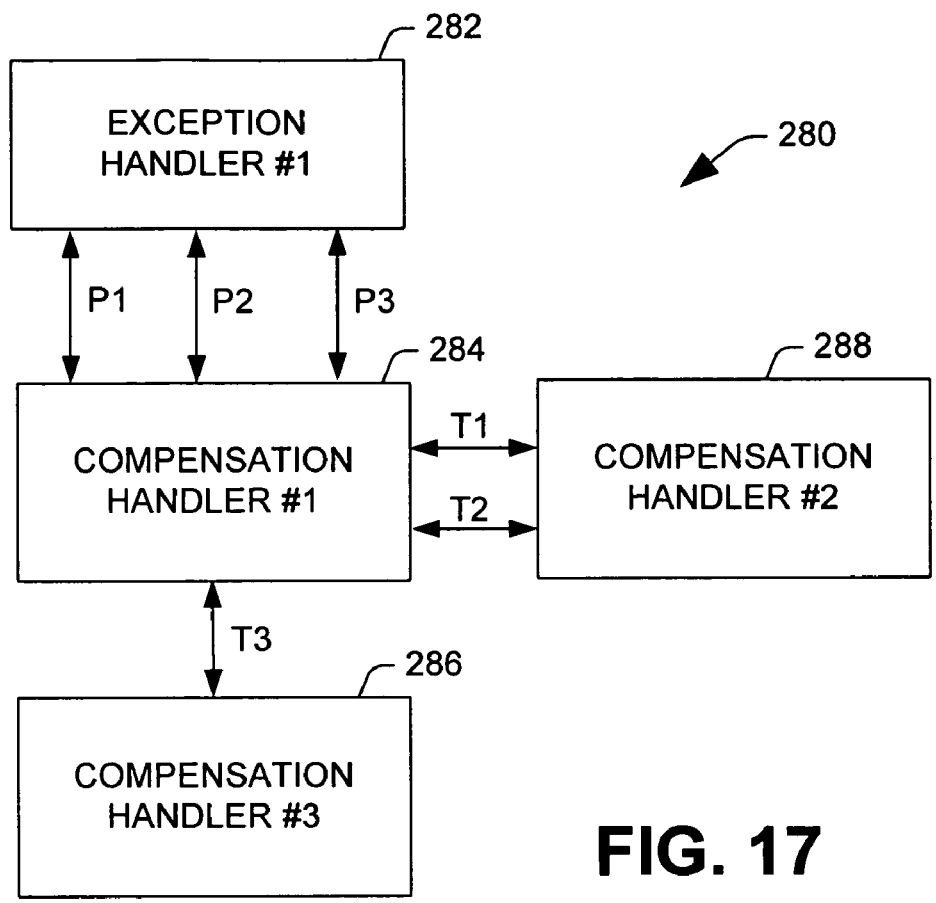
FIG. 17 illustrates an error handler system for a business transaction process in accordance with an aspect of the present invention.

FIG. 17 illustrates an error-handling system 280 for a business transaction process in accordance with an aspect of the present invention. The error-handling system 280 includes an exception handler 282 that is invoked as a result of fault detection. The exception handler 282 passes parameters P1, P2 and P3 to a first compensation handler 284. The first compensation handler 284 executes one or more compensation routines, and passes parameters T1 and T2 to a second compensation handler 288 and T3 to a third compensation handler 286. The second and third compensation handlers 288 and 286 execute one or more compensation routines using the passed parameters T1, T2 and T3. The passed parameters T1, T2 and T3 can be modified by any of the first, the second and the third compensation handlers, and the modified parameters returned to the exception handler 282. The exception handler 282 can then pass the modified parameters P1, P2 and P3 locally and/or remotely to another exception handler and/or compensation handler associated with another transaction context.

Figure 18:
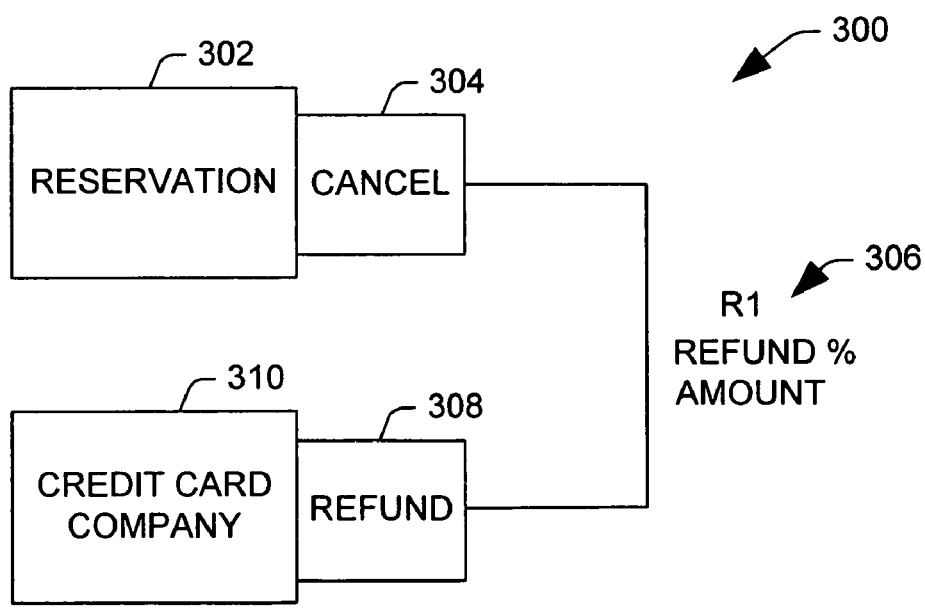
FIG. 18 illustrates an error handler system for the airline reservation service of FIG. 4 in accordance with an aspect of the present invention.

FIG. 18 illustrates an error-handling system 300 for the airline reservation service of FIG. 4. The error-handling system 300 includes a cancel compensation handler or routine 304 associated with a reservation transaction context 302, and a refund compensation handler or routine 308 associated with a credit card company transaction context 310. A cancellation occurs by a customer which is received by the reservation transaction context 302. The cancel compensation handler 304 executes a compensation routine that determines a refund percent (%) amount R1 306 that the customer is entitled to based on the time between the cancellation and the flight booked by the customer. The refund % amount R1 306 is then passed to the refund compensation handler 308, which performs a compensation routine to credit the customer's credit card. The refund % amount R1 306 is then provided to the credit card company transaction context 310, which refunds the customer credit card account. It is to be appreciated that the example of FIG.

18 is for illustrative purposes, and one or more additional parameters and messages can be passed from the cancel compensation handler 304 to the refund compensation handler 308 locally or remotely.

Figure 19:
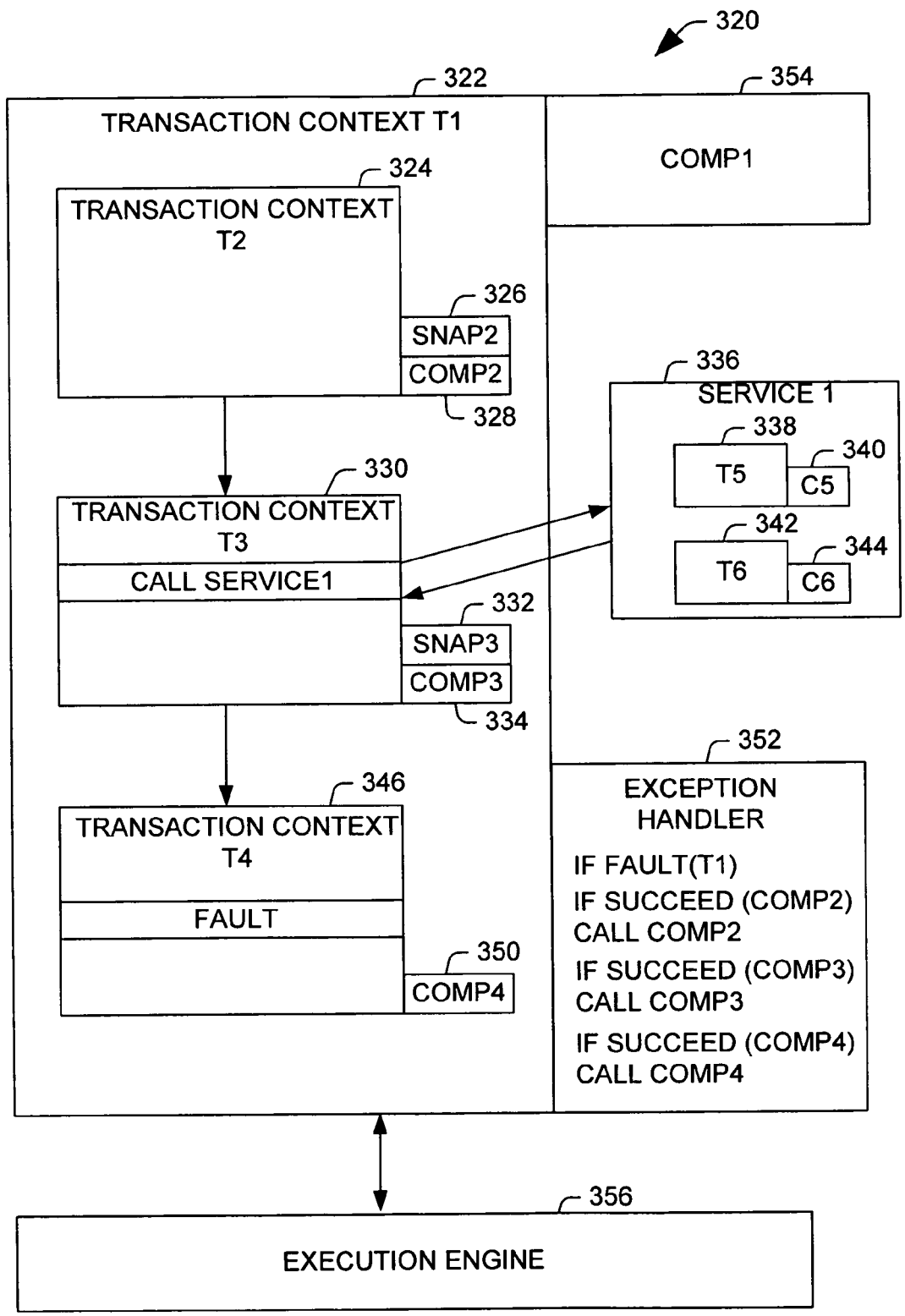
FIG. 19 illustrates a representation of an alternate business workflow schedule having an in-line service call and employing the error-handling framework in accordance with an aspect of the present invention.

FIG. 19 illustrates a representation of an alternate business workflow schedule 320 having an in-line service call and employing the error-handling framework in accordance with an aspect of the present invention. The business workflow schedule 320 includes several processes (e.g., process forms) defining units of work or contexts. The units of work or contexts can be transactions or a plurality of transactions. An execution engine 356 executes units of work associated with a transaction context in a hierarchical manner, and invokes a corresponding exception handler upon detection of a fault. In the present example of FIG. 19, the units of work are defined as transactions including a parent transaction context T1 320 with sub-transactions, transaction context T2 324, transaction context T3 330 and transaction context unit T4 346.

Associated with the parent transaction context T1 is an exception handler 352 and a compensation handler (COMP1) 354. A compensation handler (COMP2) 328 is associated with the transaction context T2 324, a compensation handler (COMP3) 334 is associated with the transaction context T3 330, and a compensation handler (COMP4) 350 is associated with the transaction context T4 346. Exception handlers for the transaction context T2 324, the transaction context T3 330 and the transaction context T4 346 are not illustrated, but could be custom exception handlers or default exception handlers provided by the execution engine 356, for example, from memory.

An important issue in compensation is to provide the correct compensation state data to the compensation handler. Since the compensation is designed to reverse the effects of a completed transaction, the relevant transaction state is the state as it existed at the completion of the transaction to be compensated. The present error-handling framework maintains a snapshot of the state visible in a transaction at its completion, and makes that snapshot available to the compensation handler if it is invoked. The snapshot is utilized by the corresponding compensation routine, so that the compensation routine has data relevant to time that the corresponding transaction completes. As previously discussed, data regarding later events can be provided to the compensation handler via input parameters.

A snapshot (SNAP2) 326 of the transaction context T2 324 is provided upon completion of the execution of the transaction T2 324, and a snapshot (SNAP3) of the transaction context T3 330 is provided upon completion of the execution of the transaction T3 330. Snapshots are only provided upon completion of a transaction. As illustrated in FIG. 19, a fault occurs during execution of transaction context T4 346. Therefore, no snapshot is provided since the transaction context T4 228 did not complete. The error-handling framework minimizes the data stored in snapshots to reflect only the data actually used by the respective compensation handler. Moreover, as compensation handlers become inaccessible (for instance if no enclosing exception or compensation handlers invoke them), the corresponding state snapshots are erased and the resources used are reclaimed.

The present invention provides for in-line invocation of separately defined orchestration services as a reusability feature. The transactions within such an inline service are also provided with compensation, according to the error-handling framework, when completed within the scope of an enclosing context in which a fault occurs and an exception handling behavior is required. The error-handling framework permits the definition of a compensation process for services designed to be invoked in this manner, and each invocation can be named and the corresponding compensation handler invoked using that name when necessary.

For example, the transaction context includes a call service 1 routine 336 within the transaction context T3 330. Upon calling the service 1 routine 336, execution of transaction T3 330 halts, and the inline service 1 routine 336 is invoked. The service 1 routine 336 executes a transaction context T5 338 and a transaction context T6 342. Associates with the transaction context T5 338 is a compensation handler or routine C5 340, and associated with the transaction context T6 342 is a compensation handler or routine C6 344. A default compensation routine and a default exception handler are provided for the entire service 1 routine 336. If any compensation handlers and exception handlers are not provided for the transaction context T5 and T6, default handlers are invoked.

Additionally, the business transaction error-handling framework provides functionality for determining the success or completion of a transaction context using a succeed component. As illustrated in the exception handler 352, a call can be made to each of the compensation handlers to determine if the associated transaction context had succeeded. The exception handler 352 determines if a fault has occurred, and if a fault has occurred, the exception handler 352 calls each of the inner context nested compensation handlers to determine if the associated context has completed. The corresponding compensation handler then utilizes the corresponding snapshot to compensate (e.g., undo) its associated transaction context. In the example of FIG. 19, the transaction context T4 346 faulted and therefore, the associated compensation handler 350 would not be executed, but error-handling would be provided by the exception handler 352.

Figure 20:
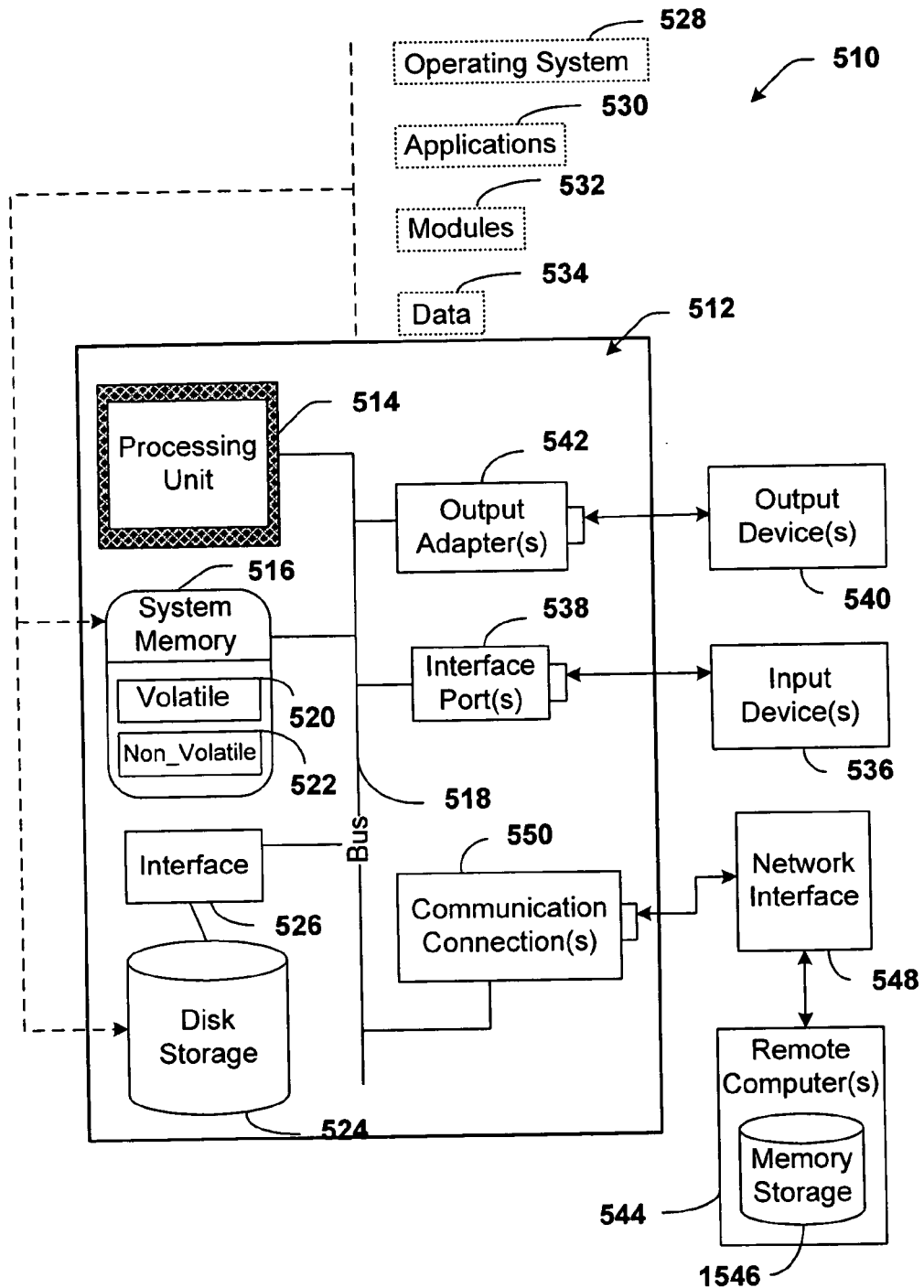
FIG. 20 illustrates an exemplary operating environment in which the present invention may function.
Figure 21:
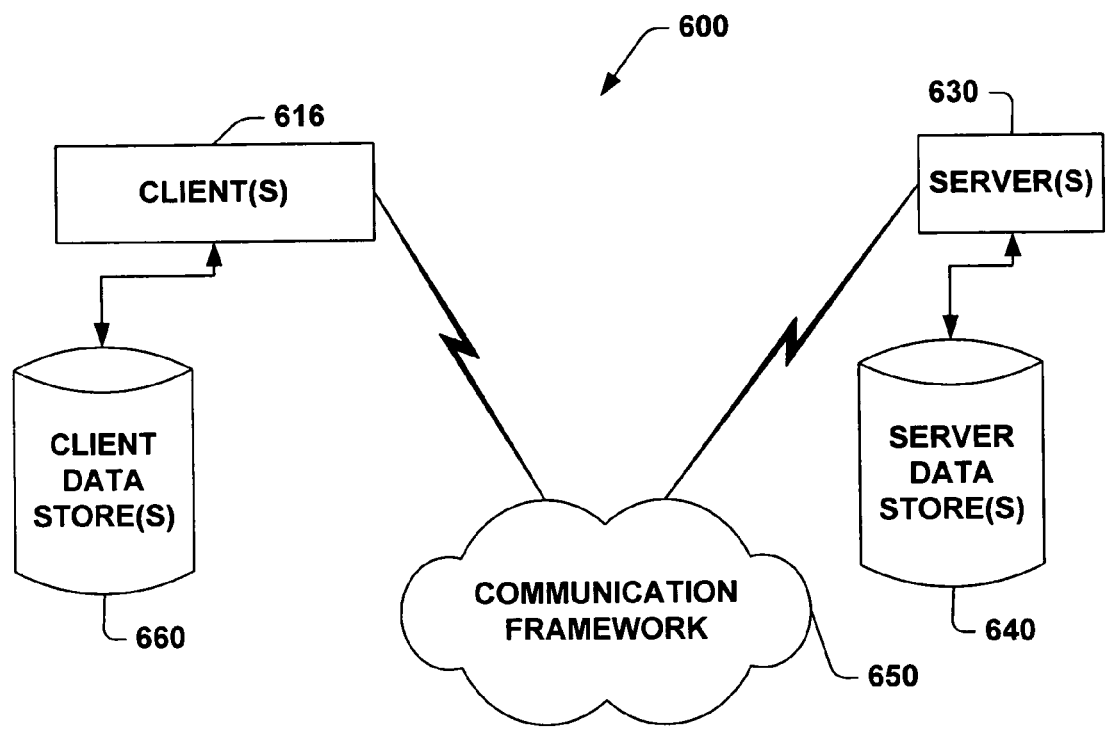
FIG. 21 is a schematic block diagram of an exemplary communication environment in accordance with the present invention.

In order to provide a context for the various aspects of the invention, FIGS. 20 and 21 and the following discussion are intended to provide a brief, general description of suitable computing environments in which the various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 20, an exemplary environment 510 for implementing various aspects of the invention includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/nonremovable, volatile/nonvolatile computer storage media. FIG. 20 illustrates, for example a disk storage 524. Disk storage 524 includes, but is not limited to, devices like a magnetic disk drive, floppy disk drive, tape drive, Jazz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 20 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the present invention can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 516 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE, Token Ring/IEEE and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

FIG. 22 is a schematic block diagram of a sample computing environment 600 with which the present invention can interact. The system 600 includes one or more client(s) 610. The client(s) 610 can be hardware and/or software (e.g., threads, processes, computing devices). The system 600 also includes one or more server(s) 630. The server(s) 630 can also be hardware and/or software (e.g., threads, processes, computing devices). The server(s) 630 can house threads to perform transformations by employing the present invention, for example. One possible communication between a client 610 and a server 630 may be in the form of a data packet adapted to be transmitted between two or more computer processes. The system 600 includes a communication framework 650 that can be employed to facilitate communications between the client(s) 610 and the server(s) 630. The client(s) 610 are operably connected to one or more client data store(s) 660 that can be employed to store information local to the client(s) 610. Similarly, the server(s)

630 are operably connected to one or more server data store(s) 640 that can be employed to store information local to the server(s) 630.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An error-handling framework for business process transactions, comprising:
    a plurality of error-handling routines that facilitates fault correction and compensation in response to one or more faults associated with a plurality of business transactions;
    a plurality of contexts, wherein at least two contexts are nested, wherein each context is associated with a unit of work and at least one error-handling routine; and
    an execution engine that performs selective compensation of the unit of work upon invocation of the at least one error-handling routine; and
    wherein the context allows a user to define ordering of compensation handlers in any user specified execution order after a workflow of the business transactions had been defined.

2. The error-handling framework of claim 1, the unit of work being a transaction.

3. The error-handling framework of claim 1, the error-handling routine comprising an exception handler and a compensation handler, the exception handler determines if a fault occurs and performs fault compensation if the unit of work has not completed, and the exception handler calling the compensation handler to perform compensation if the unit of work has completed.

4. The error-handling framework of claim 1, the unit of work being a plurality of transactions with each transaction having an associated compensation handler.

5. The error-handling framework of claim 1, the execution engine stores a snapshot of the unit of work upon completion of the unit of work, the snapshot containing data used by a compensation handler associated with the unit of work.

6. The error-handling framework of claim 1, the error-handling framework provides at least one of default exception handlers and default compensation handlers for contexts without custom error-handling routines.

7. The error-handling framework of claim 6, the execution engine invoking the at least one of default exception handlers and default compensation handlers for contexts without custom error-handling routines.

8. The error-handling framework of claim 1, the error-handling routine comprising at least one exception handler that detects a fault and calls a compensation handler, the compensation handler calls at least one other compensation handler.

9. The error-handling framework of claim 1, the unit of work comprising an in-line service call, the execution engine executing the unit of work and halting the unit of work during execution of the in-line service and resuming execution of the unit of work upon completion of the in-line call.

10. The error-handling framework of claim 9, the error-handling framework provides default error-handling to the in-line service if custom handling is not provided, the execution engine executing one of custom error-handling and default error-handling associated with the in-line service upon detection of a fault.

11. The error-handling framework of claim 1, the execution engine uses functionality within the error-handling framework to determine success and failure of the unit of work when invoking the error-handling routine.

12. A system for executing a business workflow process, comprising:
    a schedule defining a business workflow process, the schedule having a business transaction grouping;
    a context associated with the business transaction grouping and an exception handler and a plurality of compensation handlers associated with the context, the exception handler allows a user to define the execution ordering of the compensation handlers in any user specified order after the business workflow process had been defined; and
    an execution engine that executes the schedule and invokes the exception handler upon detection of a fault, the exception handler performs fault correction of the business transaction grouping if the business transaction grouping has not completed, and the exception handler calls the compensation handlers to perform compensation of the business transaction grouping if the business transaction grouping has completed.

13. The system of claim 12, at least one compensation handler comprising a first compensation handler that passes a plurality of parameters to a second compensation handler.

14. The system of claim 12, the execution engine stores state data associated with the execution of the transaction grouping, the state data optimized is to reflect state data used by the at least one compensation handler associated with transaction grouping.

15. The system of claim 12, further comprising a plurality of transaction groupings having at least one nested hierarchical relationship, and an exception handler and a compensation handler associated with a respective transaction grouping, the execution engine propagates the execution of the compensation handlers from outer transaction groupings to inner transaction groupings and exception handlers from inner transaction groupings to outer transaction groupings.

16. The system of claim 12, at least one of the exception handler and the at least one compensation handlers being default handlers invoked by the execution engine upon detection of the absence of a custom handler.

17. A method for creating a business workflow schedule, the method comprising:
    defining a unit of work of a business workflow process;
    associating a context with the unit of work;
    creating an exception handler associated with the context; and
    creating a plurality of compensation handlers associated with the context, the unit of work being a plurality of transactions with each transaction having an associated compensation handler; and
    wherein the context allows a user to define ordering of compensation handlers in any user specified execution order after a workflow of the business transactions had been defined.

18. The method of claim 17, the unit of work being one of a transaction and a plurality of transactions.

19. The method of claim 17, further comprising defining a plurality of transactions forming the business workflow schedule and associating a context with respective transactions of the plurality of transactions.

* * * * *